US012812116B2

(12) United States Patent
Mentzer et al.

(10) Patent No.: US 12,812,116 B2
(45) Date of Patent: Nov. 24, 2026

(54) METHODS AND SYSTEMS FOR A VIDEO COMPRESSION TRANSFORMER

(71) Applicant: Google LLC, Mountain View, CA (US)

(72) Inventors: Fabian Julius Mentzer, Zürich (CH); George Dan Toderici, Mountain View, CA (US); David Charles Minnen, San Carlos, CA (US); Sung Jin Hwang, Mountain View, CA (US); Sergi Caelles Prat, Zürich (CH); Mario Lucic, Zürich (CH); Eirikur Thor Agustsson, Gardabaer (IS)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/867,234

(22) PCT Filed: Jun. 6, 2023

(86) PCT No.: PCT/US2023/024514
§ 371 (c)(1),
(2) Date: Nov. 19, 2024

(87) PCT Pub. No.: WO2023/239685
PCT Pub. Date: Dec. 14, 2023

(65) Prior Publication Data

US 2025/0220186 A1 Jul. 3, 2025

Related U.S. Application Data

(60) Provisional application No. 63/365,882, filed on Jun. 6, 2022.

(51) Int. Cl.
*H04N 19/13* (2014.01)
*G06T 9/00* (2006.01)
(Continued)

(52) U.S. Cl.
CPC ............ *H04N 19/13* (2014.11); *G06T 9/002* (2013.01); *H04N 19/149* (2014.11); *H04N 19/91* (2014.11)

(58) Field of Classification Search
CPC ...... G06T 9/002; H04N 19/13; H04N 19/149; H04N 19/91; H04N 19/503; H04N 19/593
(Continued)

(56) References Cited

U.S. PATENT DOCUMENTS

2011/0206131 A1* 8/2011 Vafin ...................... H03M 7/40 704/207
2023/0100413 A1* 3/2023 Zhu .......................... G06T 7/11 375/240.18
(Continued)

OTHER PUBLICATIONS

Chang et al., "MaskGIT: Masked Generative Image Transformer," arXiv:2202.04200v1, Feb. 8, 2022, 23 pages.
(Continued)

*Primary Examiner* — Christopher S Kelley
*Assistant Examiner* — Ana Picon-Feliciano
(74) *Attorney, Agent, or Firm* — DORITY & MANNING, P.A.

(57) ABSTRACT

Apparatus and methods related to encoding, by an encoder of a transmitting computing device, a plurality of successive input video frames as a corresponding sequence of quantized representations; predicting, by a transformer of the transmitting computing device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations; generating, by the transmitting computing device, a plurality of compressed
(Continued)

video frames by applying, based on the predicted PMF, anentropy coding to each quantized representation, wherein the entropy coding comprises assigning a smaller number of bits to values that have a higher frequency of occurrence; and transmitting, by the transmitting computing device, the plurality of compressed video frames.

22 Claims, 15 Drawing Sheets

(51) Int. Cl.
*H04N 19/149* (2014.01)
*H04N 19/91* (2014.01)

(58) Field of Classification Search
USPC .................................................... 375/240.02
See application file for complete search history.

(56) References Cited

U.S. PATENT DOCUMENTS

2024/0354553 A1* 10/2024 Finlay .................. G06N 3/0495
2024/0414381 A1* 12/2024 Wu ........................ G06N 3/088

OTHER PUBLICATIONS

International Searching Autohrity, International Search Report and Written Opinion mailed Sep. 12, 2023, issued in connection with International Patent Application No. PCT/US2023/024514, filed Jun. 6, 2023, 18 pages.
Li et al., "Hybrid Spatial-Temporal Entropy Modelling for Neural Video Compression," Proceedings of the 30th ACM International Conference on Multimedia (MM'22), arXiv:2207.05894v1, Jul. 13, 2022, 17 pages.
Mentzer et al., "M2T: Masking Transformers Twice for Faster Decoding," arXiv:2304.07313v1, Apr. 14, 2023, 13 pages.
Mentzer et al., "VCT: A Video Compression Transformer," arXiv. 2206.07307v1, Jun. 15, 2022, 16 pages.
Yang et al., "Insights from Generative Modeling for Neural Video Compression," arXiv:2107.13136v1, Jul. 28, 2021, 14 pages.

* cited by examiner

405

| | Components trained | Loss | $B$ | $N_P$ | LR | Steps | steps/s |
|---|---|---|---|---|---|---|---|
| Stage I | $E, D$ | $r + \lambda d$ | 16 | 1 | $1\text{E}^{-4}$ | 2M | 100 |
| Stage II | $T_{\text{sep}}, T_{\text{joint}}, T_{\text{cur}}$ | $r$ | 32 | 3 | $1\text{E}^{-4}$ | 1M | 10 |
| Stage III | $T_{\text{sep}}, T_{\text{joint}}, T_{\text{cur}}, E, D$ | $r + \lambda d$ | 32 | 3 | $2.5\text{E}^{-5}$ | 250k | 5 |

700A

FIG. 7A

| | Context | LRP | bpp ↓ | PSNR ↑ |
|---|---|---|---|---|
| No previous frames (image codec) | 0 | | 0.218 | 36.1 |
| 1 previous frame | 1 | | 0.0907 (-58%) | 36.1 |
| 2 previous frames | 2 | | 0.0775 (-64%) | 36.1 |
| 2 previous frames and LRP (VCT (Ours)) | 2 | ✓ | 0.0775 (-64%) | 36.8 (+0.7dB) |

700B

FIG. 7B

| | | $T_{\text{sep}}$ and $T_{\text{joint}}$ | $T_{\text{cur}}$ | EC | $D$ | FPS estimate |
|---|---|---|---|---|---|---|
| Ours | 1080p | 168 ms | 326 ms | 30.5 ms | 168 ms | ≈1.4 FPS |
| | 720p | 37.6 ms | 44.8 ms | 17.0 ms | 49.5 ms | ≈6.7 FPS |
| | 480p | 18.1 ms | 23.1 ms | 9.02 ms | 23.3 ms | ≈13.6 FPS |
| | 360p | 7.3 ms | 14.9 ms | 4.24 ms | 10.1 ms | ≈27.3 FPS |

700C

FIG. 7C

METHODS AND SYSTEMS FOR A VIDEO COMPRESSION TRANSFORMER

CROSS-REFERENCE TO RELATED DISCLOSURE

This application is a national stage application under 35 U.S.C. § 371 of International Application No. PCT/US2023/024514, filed Jun. 6, 2023, which in turn claims priority to U.S. Provisional Application No. 63/365,882, filed Jun. 6, 2022, the disclosures of which are explicitly incorporated by reference herein in their entirety.

BACKGROUND

Methods for video compression generally rely on an increasing number of architectural biases and priors, including motion prediction and warping operations, resulting in complex models. Neural network based video compression techniques have recently emerged to rival their non-neural counterparts in rate-distortion performance. Existing models utilize complex connections between various sub-components. The resulting methods are complicated, challenging to implement, and constrain themselves to work well on data that matches the architectural biases. In particular, several techniques rely on some form of motion prediction followed by a warping operation.

SUMMARY

As described herein, flow prediction, warping, and residual compensation, may be replaced with a transformer-based temporal entropy model. Experiments indicate that the resulting video compression transformer (VCT) can outperform existing techniques on standard video compression data sets, while being free from architectural biases and priors.

The techniques described herein can serve as a foundation for a new generation of video codecs. Such techniques can have a net-positive impact on society by reducing the bandwidth needed for video conferencing and video streaming and improving the utilization of storage space, thereby increasing the capacity of knowledge preservation.

In one aspect, a computer-implemented method is provided. An encoder of a transmitting computing device encodes a plurality of successive input video frames as a corresponding sequence of quantized representations. A transformer of the transmitting computing device predicts a probability mass function (PMF) as a conditional distribution of a given quantized representation given at least one dependency between one or more quantized representations that occur prior to the given quantized representation in the sequence of quantized representations. The transmitting computing device generates a plurality of compressed video frames by applying, based on the predicted PMF, an entropy coding to each quantized representation, wherein the entropy coding comprises assigning a smaller number of bits to values that have a higher frequency of occurrence. The transmitting computing device transmits the plurality of compressed video frames.

In another aspect, a computing device is provided. The computing device includes one or more processors and data storage. The data storage has stored thereon computer-executable instructions that, when executed by one or more processors, cause the computing device to carry out functions. The functions include: encoding, by an encoder of a transmitting computing device, a plurality of successive input video frames as a corresponding sequence of quantized representations; predicting, by a transformer of the transmitting computing device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations; generating, by the transmitting computing device, a plurality of compressed video frames by applying, based on the predicted PMF, an entropy coding to each quantized representation, wherein the entropy coding comprises assigning a smaller number of bits to values that have a higher frequency of occurrence; and transmitting, by the transmitting computing device, the plurality of compressed video frames.

In another aspect, a computer program is provided. The computer program includes instructions that, when executed by a computer, cause the computer to carry out functions. The functions include: encoding, by an encoder of a transmitting computing device, a plurality of successive input video frames as a corresponding sequence of quantized representations; predicting, by a transformer of the transmitting computing device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations; generating, by the transmitting computing device, a plurality of compressed video frames by applying, based on the predicted PMF, an entropy coding to each quantized representation, wherein the entropy coding comprises assigning a smaller number of bits to values that have a higher frequency of occurrence; and transmitting, by the transmitting computing device, the plurality of compressed video frames.

In another aspect, an article of manufacture is provided. The article of manufacture includes one or more computer readable media having computer-readable instructions stored thereon that, when executed by one or more processors of a computing device, cause the computing device to carry out functions. The functions include: encoding, by an encoder of a transmitting computing device, a plurality of successive input video frames as a corresponding sequence of quantized representations; predicting, by a transformer of the transmitting computing device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations; generating, by the transmitting computing device, a plurality of compressed video frames by applying, based on the predicted PMF, an entropy coding to each quantized representation, wherein the entropy coding comprises assigning a smaller number of bits to values that have a higher frequency of occurrence; and transmitting, by the transmitting computing device, the plurality of compressed video frames.

In another aspect, a system is provided. The system includes means for encoding, by an encoder of a transmitting computing device, a plurality of successive input video frames as a corresponding sequence of quantized representations; means for predicting, by a transformer of the transmitting computing device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations; means for generating, by the transmitting computing device, a plurality of compressed video frames by applying, based on the predicted PMF, an entropy coding to each quantized representation, wherein the entropy coding comprises assigning a smaller number of bits to values that have a higher frequency of occurrence; and means for transmitting, by the transmitting computing device, the plurality of compressed video frames.

In another aspect, a decoding device is provided. The decoding device includes one or more processors and data storage. The data storage has stored thereon computer-executable instructions that, when executed by one or more processors, cause the decoding device to carry out functions. The functions include receiving, by a decoder of the decoding device, a plurality of compressed video frames as a corresponding sequence of quantized representations. The functions also include predicting, by a transformer of the decoding device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations. The functions further include generating, by the decoding device, a plurality of decompressed video frames by applying, based on the predicted PMF, an entropy decoding to each quantized representation, wherein the entropy decoding comprises reversing an entropy encoding, and the entropy encoding having assigned a smaller number of bits to values with a higher frequency of occurrence. The functions additionally include providing, by the decoding device, the plurality of decompressed video frames.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 7A illustrates a table for three stages of the training, in accordance with example embodiments.

FIG. 7B illustrates a table for experimental results for the number of previous frames to be input to the transformer, in accordance with example embodiments.

FIG. 7C illustrates a table for experimental runtime of the components, in accordance with example embodiments.

DETAILED DESCRIPTION

Figure 1:
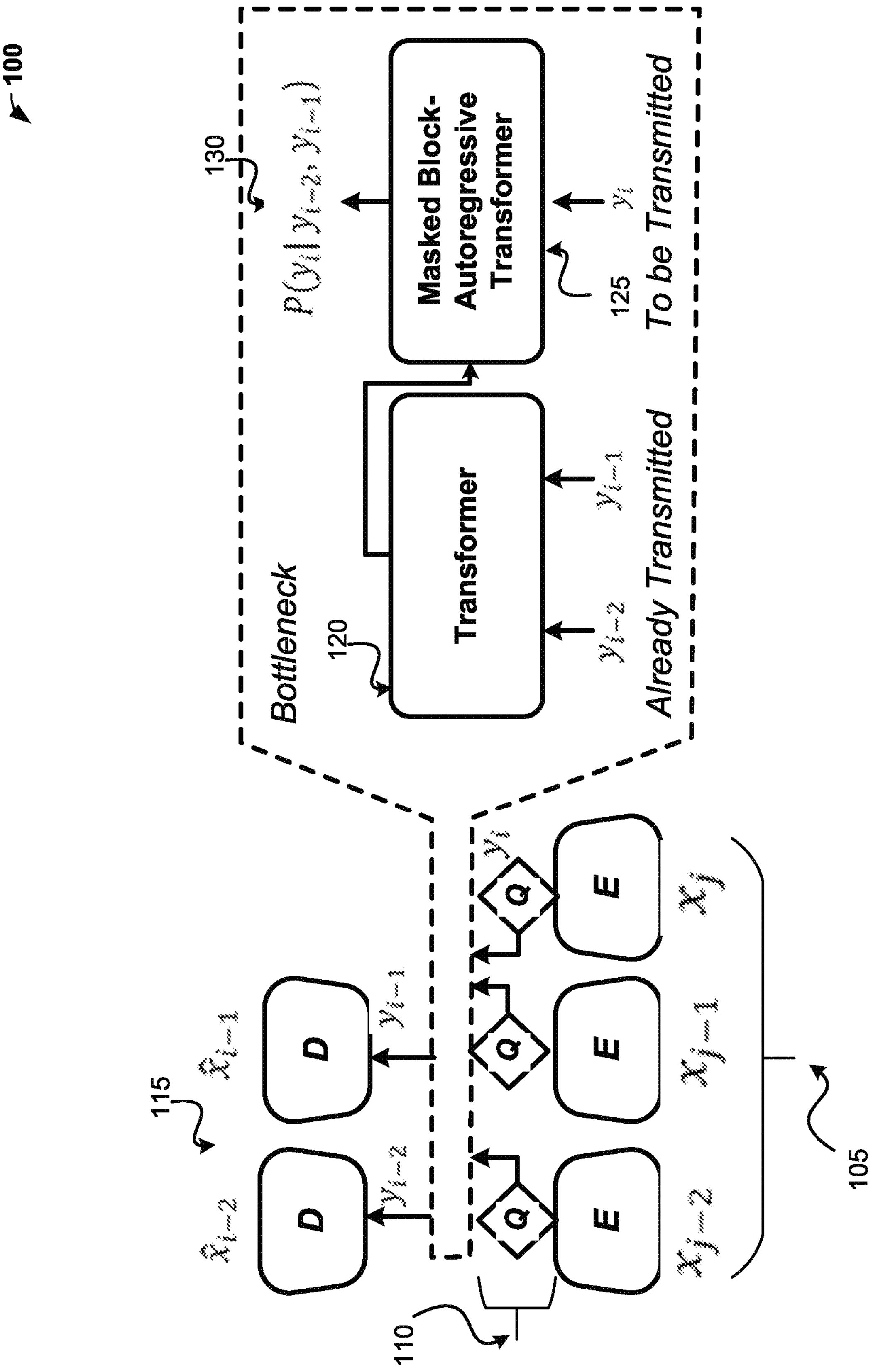
FIG. 1 is a diagram illustrating an example transformer architecture for video compression, in accordance with example embodiments.

This application relates to utilizing neural networks, such as transformers, for video compression (e.g., neural video compression). Existing techniques generally rely on an increasing number of architectural biases and priors, including motion prediction and warping operations, thereby resulting in complex models. As described herein, input frames may be independently mapped to representations, and a transformer may be used to model the dependencies between such representations. In particular, the transformer may be trained to predict a distribution of future representations based on past representations. The resulting video compression transformer can be shown to outperform existing methods based on standard video compression data sets. Experiments on synthetic data demonstrate that the transformer based models can learn to process complex motion patterns such as panning, blurring, and fading purely from data.

Overview

Neural network based video compression techniques have recently emerged to rival their non-neural counterparts in rate-distortion performance. These methods tend to incorporate various architectural biases and priors inspired by the classic, non-neural approaches. Like the "hand-crafted" classical codecs, neural approaches are also becoming increasingly "hand-crafted", with complex connections between the many sub-components. The resulting methods can be complicated, can be challenging to implement, and are generally constrained to work well only on data that matches the architectural biases. In particular, many methods rely on some form of motion prediction followed by a warping operation. These methods may warp previous reconstructions with the predicted flow, and calculate a residual.

As described herein, flow prediction, warping, and residual compensation, may be replaced with a transformer-based temporal entropy model. The resulting video compression transformer (VCT) can be demonstrated to outperform existing methods on standard video compression data sets, while being free from their architectural biases and priors. Furthermore, as described herein, synthetic data may be created to explore the effect of architectural biases. In particular, the described techniques perform well for operations such as panning on static frames, or blurring, despite the transformer not having any of these components. More crucially, the described models outperform existing models on videos that have no obvious matching architectural component (e.g., sharpening, fading between scenes). This highlights the benefit of removing hand-crafted elements and letting a transformer learn from data.

In some embodiments, the transformers may be used to compress videos in two steps: first, a lossy transform coding may be used to map frames $x_i$ from image space to quantized representations $y_i$, independently for each frame. Subsequently, a reconstruction $\hat{x}_i$ may be recovered from $y_i$. Second, the transformer may be configured to leverage temporal redundancies to model the distributions of the representations. Such predicted distributions may then be utilized to losslessly compress the quantized $y_i$ using entropy coding. The better the transformer predicts the distributions, the fewer bits may be required to store the representations.

Such an approach to video compression avoids complex state transitions or warping operations by letting the transformer learn to leverage arbitrary relationships between frames. Also, for example, temporal error propagation may be reduced by the construction of the transformer since the reconstruction $\hat{x}_i$ does not depend on previous reconstructions. In warping-based approaches, the reconstruction $\hat{x}_i$ is a function of the warped $\hat{x}_{i-1}$. Accordingly, visual errors in $\hat{x}_i$ are generally propagated forward and require additional bits to correct with residuals.

In some aspects, the model VCT described herein may be viewed in terms of a language translation transformer. For example, two previous representations $y_{i-2}$, $y_{i-1}$ are to be translated to $y_i$. However, there are various challenges in the way of directly applying the NLP formulation.

Consider an example 1080p video frame; using a typical neural image compression encoder that downscales by a factor 16 and has 192 output channels, a (1080, 1920, 3)-dimensional input frame can be mapped to a (68, 120, 192)-dimensional feature representation leading to approximately 1.6 million symbols. Naively correlating all of these symbols to all symbols in a previous representation would yield a 1.6 M×1.6 M-dimensional attention matrix. To address this computationally impractical problem, independence assumptions may be added to shrink the attention matrix and enable parallel execution on various subsets of the symbols.

FIG. 1 is a diagram illustrating an example transformer architecture 100 for video compression, in accordance with example embodiments. Some embodiments may involve encoding, by an encoder of a transmitting computing device, a plurality of successive input video frames as a corresponding sequence of quantized representations. For example, input frames 105, denoted as x (e.g., $x_{j-2}$, $x_{j-1}$, $x_j$) may be mapped, independently and lossily, into quantized representations 110, denoted as y (e.g., $y_{i-2}$, $y_{i-1}$, y). A reconstruction 115, denoted as $\hat{\imath}$ may be recovered from the quantized representations 110. Some embodiments may involve predicting, by a transformer of the transmitting computing device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations. For example, to store $y_i$ with few bits, one or more transformers 120 and one or more masked transformers 125 may be used to model dependencies, and to predict a probability mass function (PMF) 130 (denoted as P) for $y_i$, given previously transmitted representations. In some embodiments, the dependency may be a temporal dependency. Some embodiments may involve generating, by the transmitting computing device, a plurality of compressed video frames by applying, based on the predicted PMF, an entropy coding to each quantized representation, wherein the entropy coding comprises assigning a smaller number of bits to values that have a higher frequency of occurrence. For example, P may be used to losslessly compress the quantized $y_i$ using entropy coding. Generally, a better prediction of the conditional probability P 130 by transformers 120, 125 can translate into fewer bits being required to store $y_i$. The model as described does not have to include hard-coded components for motion prediction and/or warping. These aspects are described in more detail.

Frame Encoding and Decoding

In some embodiments, the video coding process may include two parts: first, each frame $x_i$ may be independently encoded into a quantized representation $y_i=[E(x_i)]$ using a neural network encoder, E (e.g., a convolutional neural network (CNN)-based image encoder). In some embodiments, the encoding of each frame may include a quantization of the quantized representation to an integer grid. In some embodiments, the encoder may perform a spatial downscaling and increase a channel dimension. For example, the encoder E may be configured to downscale spatially and increase the channel dimension. In some embodiments, this may result in a (H, W, $d_c$)-dimensional feature map $y_i$, where the parameters H, W may be 16 times smaller than the input image resolution. From $y_i$, a reconstruction $\hat{\imath}_i$ may be recovered using the decoder D. Some embodiments may involve applying neural image compression to train one or more of the encoder or the decoder to be respective lossy transforms, wherein a target distortion variable is based on a range of each quantized representation. For example, encoder E, and/or decoder D may be trained using neural image compression techniques. For example, E, D may be trained to be lossy transforms reaching nearly any desired distortion $d(x_i, \hat{x}_i)$, by varying a size of the range of each element in $y_i$. For illustrative purposes and to maintain a clearer exposition, an encoder-decoder pair E, D may be assumed to reach a fixed distortion.

Generally speaking, subsequent to a lossy conversion of the sequence of input frames $x_i$ to a sequence of representations, $y_i=\lfloor E(x_i)\rceil$, $y_i$ may be losslessly stored to a disk. However, in some embodiments, such an approach may be sub-optimal. For example, let each element $y_{i,j}$ of $y_i$ denote a symbol in $\mathcal{S}=\{-L, \ldots, L\}$. Assuming that all $|\mathcal{S}|$ symbols appear with equal probability, i.e., $P(y_{i,j})=1/|\mathcal{S}|$, $y_i$ may be transmitted using $H \cdot W \cdot d_c \cdot \log_2|\mathcal{S}|$ bits. Using parameter L=32, this would imply that 9 megabytes, or ≈2 Gbps at 30 fps, may be needed to encode a single HD frame (where $H \cdot W \cdot d_c \approx 1.6$ M). Although this is a valid compression scheme that can result in the desired distortion (e.g., the fixed distortion as described previously), this can be inefficient. Accordingly, there is a need to improve such compression techniques, as is described herein.

An Example Coding Scheme

In some embodiments, given a probability mass function (PMF) P estimating a distribution Q of symbols in $y_i$, entropy coding (EC) may be utilized to transmit $y_i$ with a number of bits given by the expression $H \cdot W \cdot d_c \cdot \mathbb{E}_{y \sim Q(y_i)}[-\log_2 P(y)]$. By using EC, more frequently occurring values may be encoded with fewer bits, thereby improving the efficiency of compression. In some embodiments, an average number of bits corresponds to a cross-entropy of the conditional distribution with respect to the predicted PMF.

Generally, the expectation term $\mathbb{E}$ (in the above expression) can represent an average bit count that corresponds to the cross-entropy of Q with respect to P. Accordingly, P may be estimated as a conditional distribution using transformer models. In some embodiments, the predicting of the PMF may involve maintaining a coding efficiency of the entropy coding by adjusting the cross-entropy. For example, the cross-entropy may be minimized, thereby maximizing coding efficiency. Such details are now provided.

Transformer-Based Temporal Entropy Model

To transmit a video of F frames, $x_1, \ldots, x_F$, the encoder E may be mapped over each frame resulting in quantized representations $y_1, \ldots, y_F$. In the event the $y_i, \ldots, y_{i-1}$ have already been transmitted, to transmit $y_i$, the transformer may be configured to predict $P(y_i|y_{i-2}, y_{i-1})$. Using this distribution, entropy encoding may be performed on $y_i$ to create a compressed, binary representation that may then be transmitted.

To compress a video, the procedure described above may be applied iteratively, by utilizing the transformer to predict $P(y_j|y_{j-2}, y_{j-1})$ for $j \in \{1, \ldots, F\}$, and padding with zeros when predicting distributions for $y_1$, $y_2$. The receiver or receiving device or decoding device may follow the same procedure to recover $y_j$. Some embodiments may involve receiving, by a decoder of the decoding device, a plurality of compressed video frames as a corresponding sequence of quantized representations. For example, with reference to FIG. 1, quantized representations 110, denoted as y (e.g., $y_{i-2}$, $y_{i-1}$, y) may be received by the decoder D. Some embodiments may involve predicting, by a transformer of the decoding device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations. For example, the decoder iteratively determines $P(y_j|y_{j-2}, y_{j-1})$. Some embodiments may involve generating, by the decoding device, a plurality of decompressed video frames by applying, based on the predicted PMF, an entropy decoding to each quantized representation, wherein the entropy decoding comprises reversing an entropy encoding, and the entropy encoding having assigned a smaller number of bits to values with a higher frequency of occurrence. For example, the decoder uses $P(y_j|y_{j-2}, y_{j-1})$ iteratively to entropy decode each $y_j$. After determining each representation, $y_1, y_2, \ldots, y_F$, the receiver can be configured to generate the reconstructions, and provide the plurality of decompressed video frames.

Tokens

Figure 2:
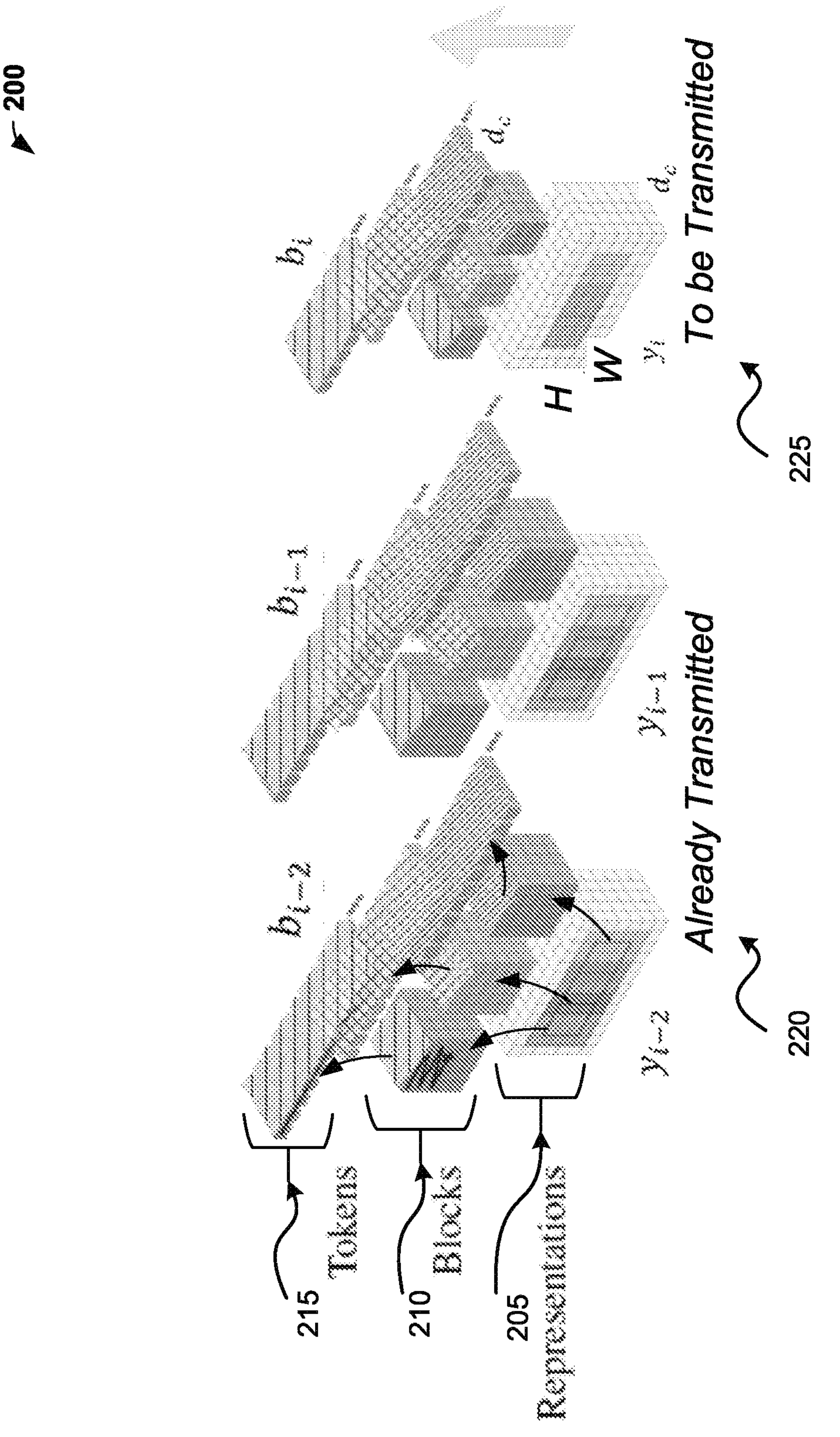
FIG. 2 is a diagram illustrating an example transformation from a representation to a corresponding token, in accordance with example embodiments.

FIG. 2 is a diagram illustrating an example transformation 200 from a representation 205 to a corresponding token 215, in accordance with example embodiments. Some embodiments involve splitting the given quantized representation spatially into non-overlapping blocks of size N×N. For example, when processing the current representation $y_i$, it may be split spatially into non-overlapping blocks 210 with size $w_C \times w_C$ as illustrated in FIG. 2. The one or more quantized representations that occur prior to the given quantized representation may be configured to be overlapping blocks of size M×M, with M>N. For example, previous representations $y_{i-2}$, $y_{i-1}$ (as represented by already transmitted 220) become corresponding overlapping $w_P \times w_P$ blocks (where $w_P > w_C$) to provide both temporal and spatial context for predicting $P(y_i|y_{i-2}, y_{i-1})$. Generally, a larger spatial extent can provide useful context to predict the distribution of a current block. In some embodiments, the blocks 210 may span a relatively large spatial region in image space due to the downscaling performed by the convolutional encoder E. In some embodiments, each block may be spatially flattened to generate one or more tokens for the transformer. Also, as illustrated, each block 210 may be flattened spatially (see FIG. 2) to obtain tokens 215 for the transformers.

As illustrated, a sliding window may be used to split a given representation 205, denoted as y, into non-overlapping $w_C \times w_C$ blocks 210. Also, for example, previous representations, represented by already transmitted 220 and denoted as $y_{i-1}$, $y_{i-2}$, may be split into overlapping $w_P \times w_P$ blocks 210 with stride $w_C$ ($w_P > w_C$). Blocks 210 may be flattened spatially (e.g., raster-scan order, see left arrows) to obtain tokens 215 for the transformer, which remain $d_C$-dimensional since they are another view of $y_i$. Although FIG. 2 illustrates an example with $w_C=3$, $w_P=5$, $d_C=5$, other values may be used as well, such as, for example $w_C=4$, $w_P=8$, $d_C=192$. In some embodiments, the transformers may be configured to run independently on corresponding blocks 210 and/or tokens 215, i.e., tokens of the same shade in FIG. 2 may be processed together, trading reduced spatial context for parallel execution. As a side benefit, the number of tokens for the transformers does not have to be a function of image resolution.

Generally speaking, an independence assumption enables the process to focus on a single set of blocks 210. As illustrated, distributions for the $$w_C^2 = 16 \text{ tokens } t_1, t_2, \ldots, t_{16},$$

may be predicted in block $b_i$ (in to be transmitted block 225) given the $$2w_P^2 = 128$$

tokens from the previous blocks $b_{i-2}$, $b_{i-1}$ (in already transmitted blocks 220).

Figure 3:
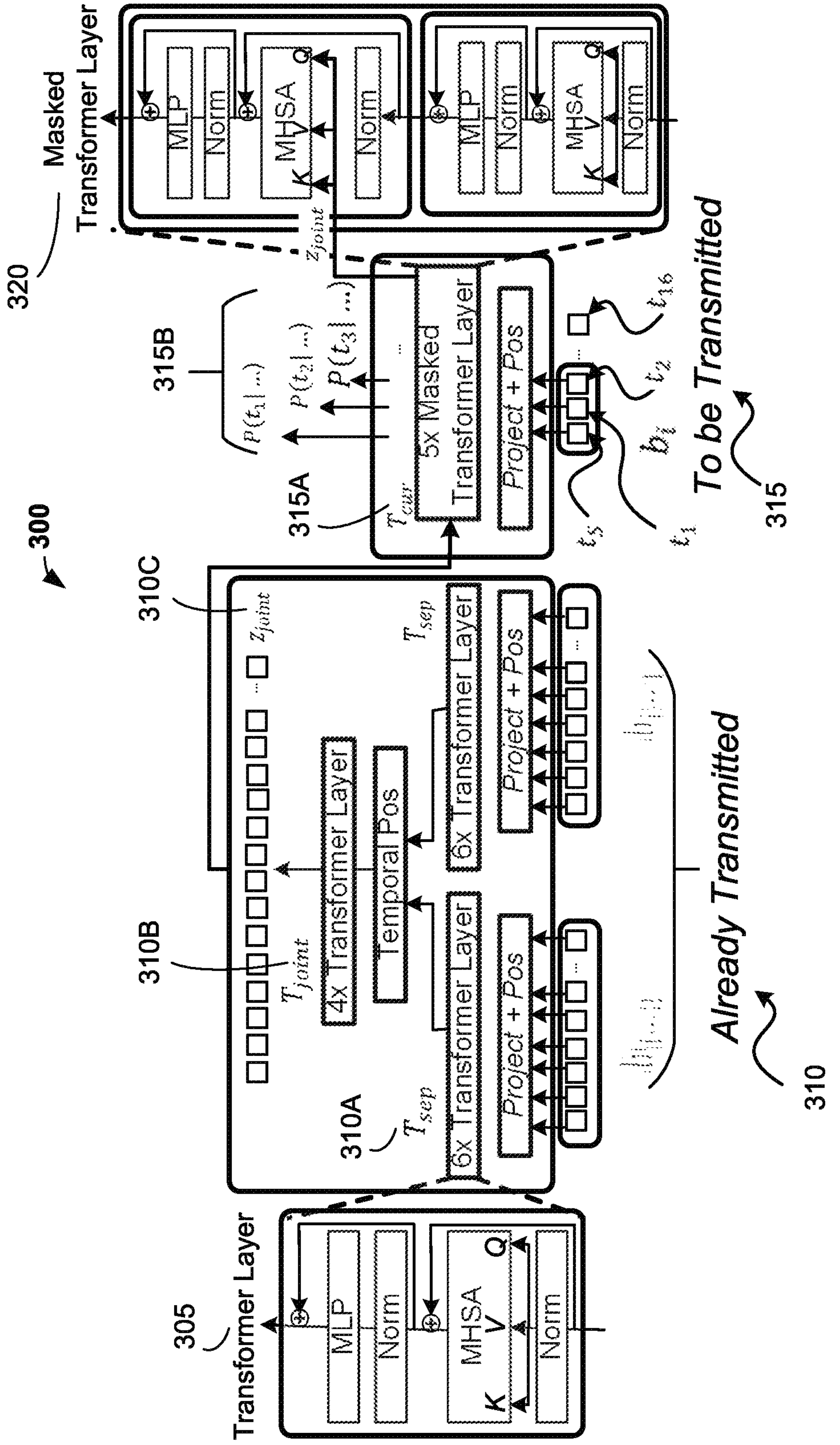
FIG. 3 illustrates example operations of a transformer, in accordance with example embodiments.
Figure 4A:
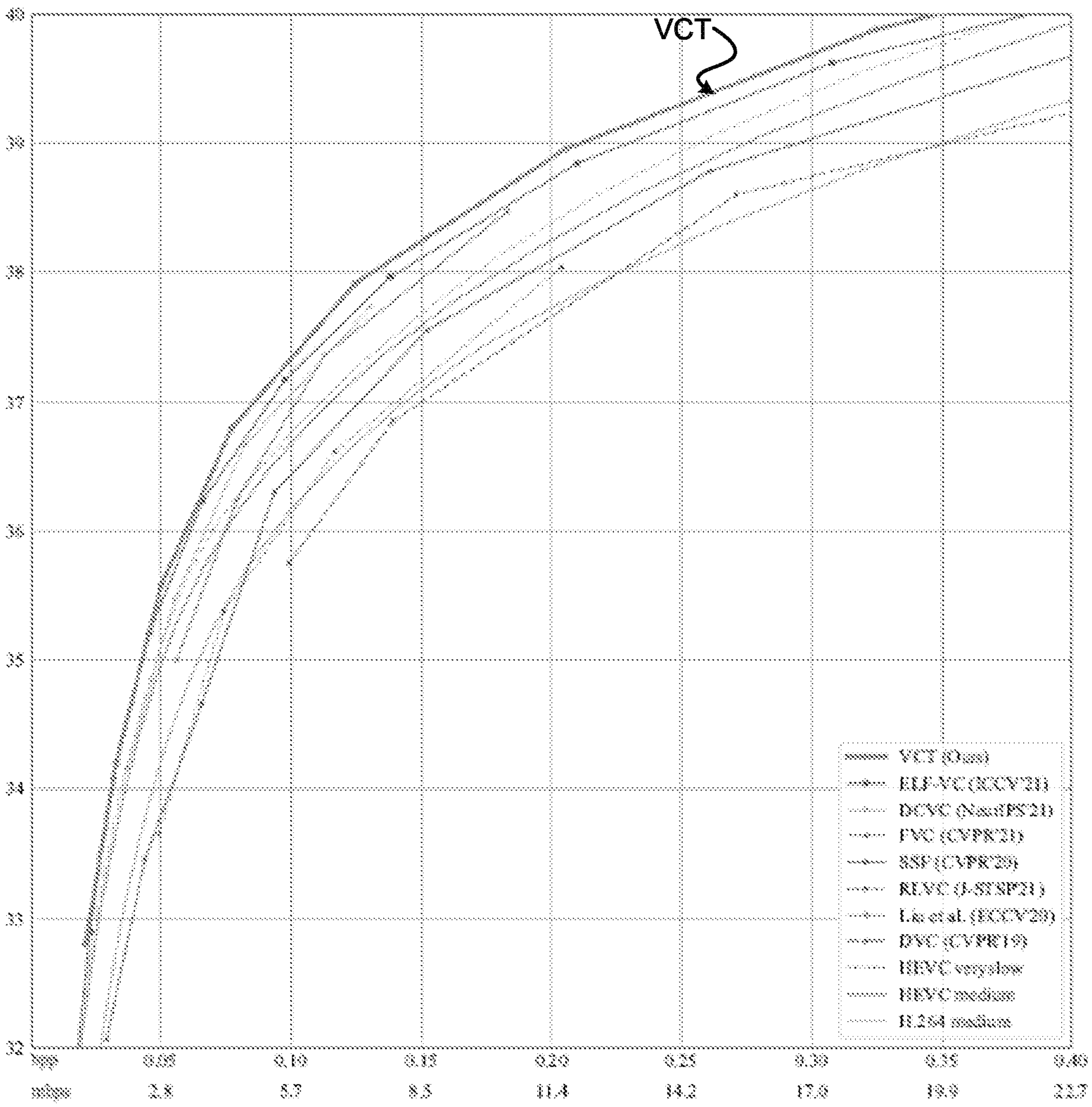
FIG. 4A illustrates example rate distortions, in accordance with example embodiments.
Figure 4B:
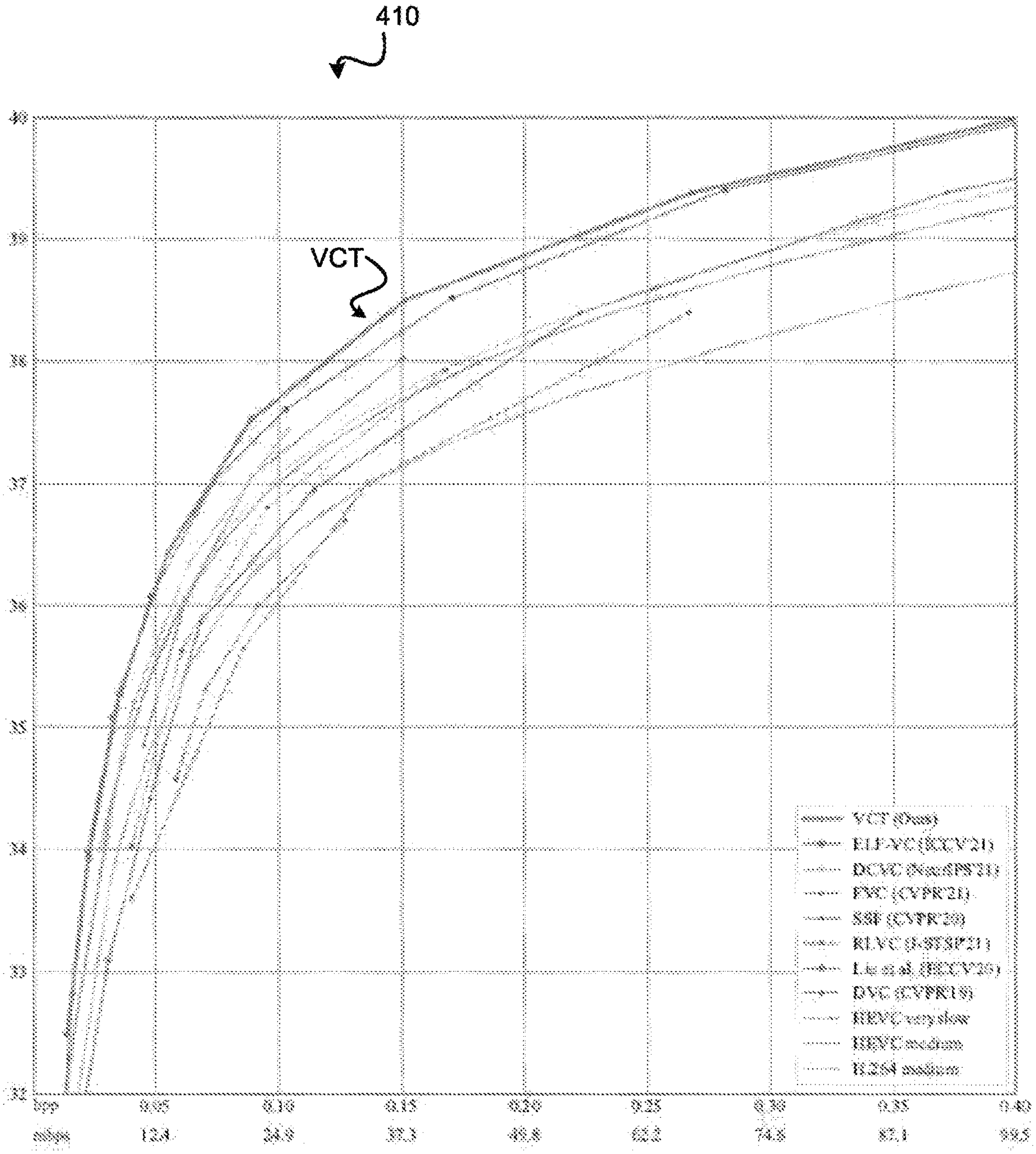
FIG. 4B illustrates example rate distortions, in accordance with example embodiments.
Figure 4C:
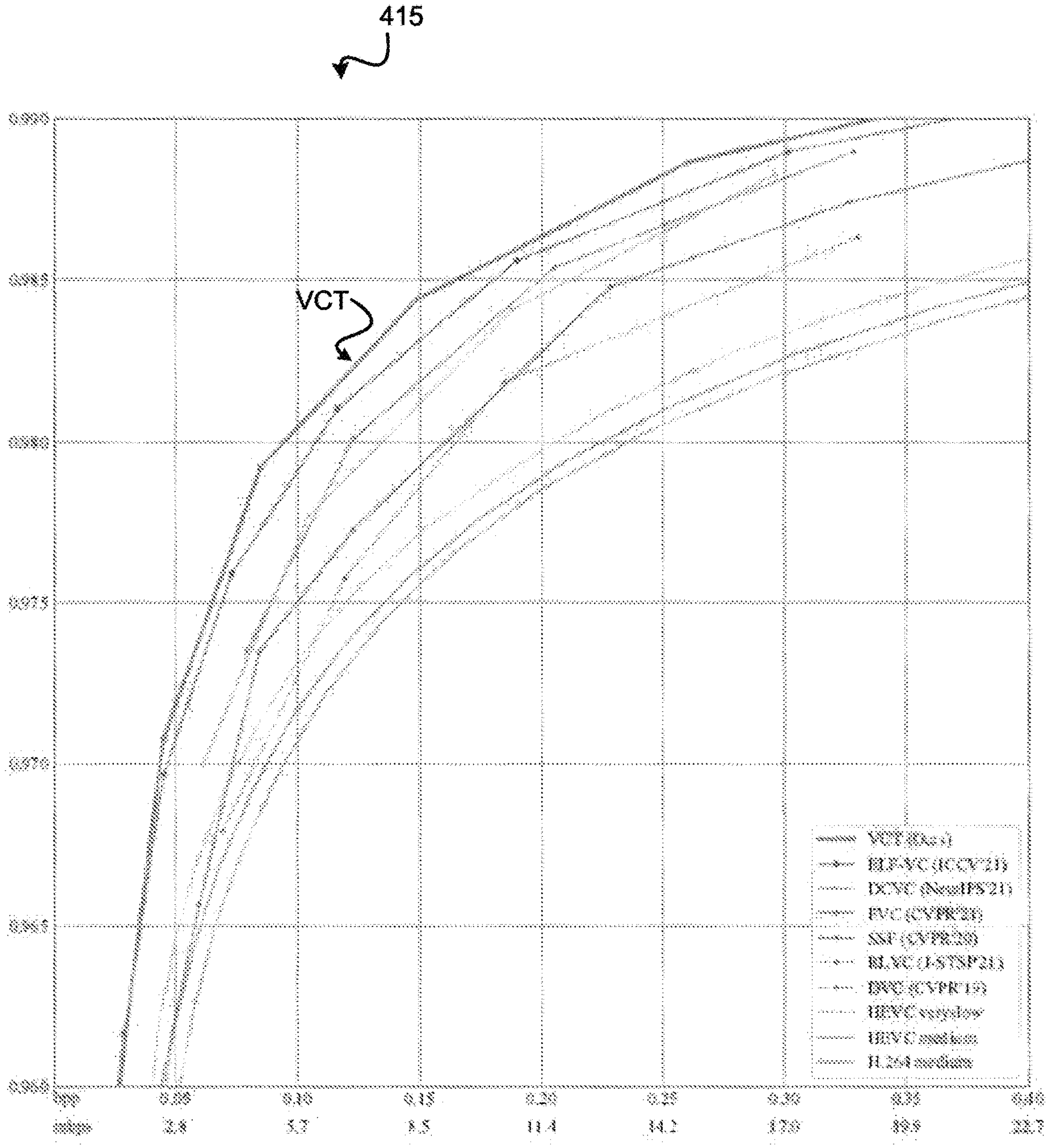
FIG. 4C illustrates example rate distortions, in accordance with example embodiments.
Figure 4D:
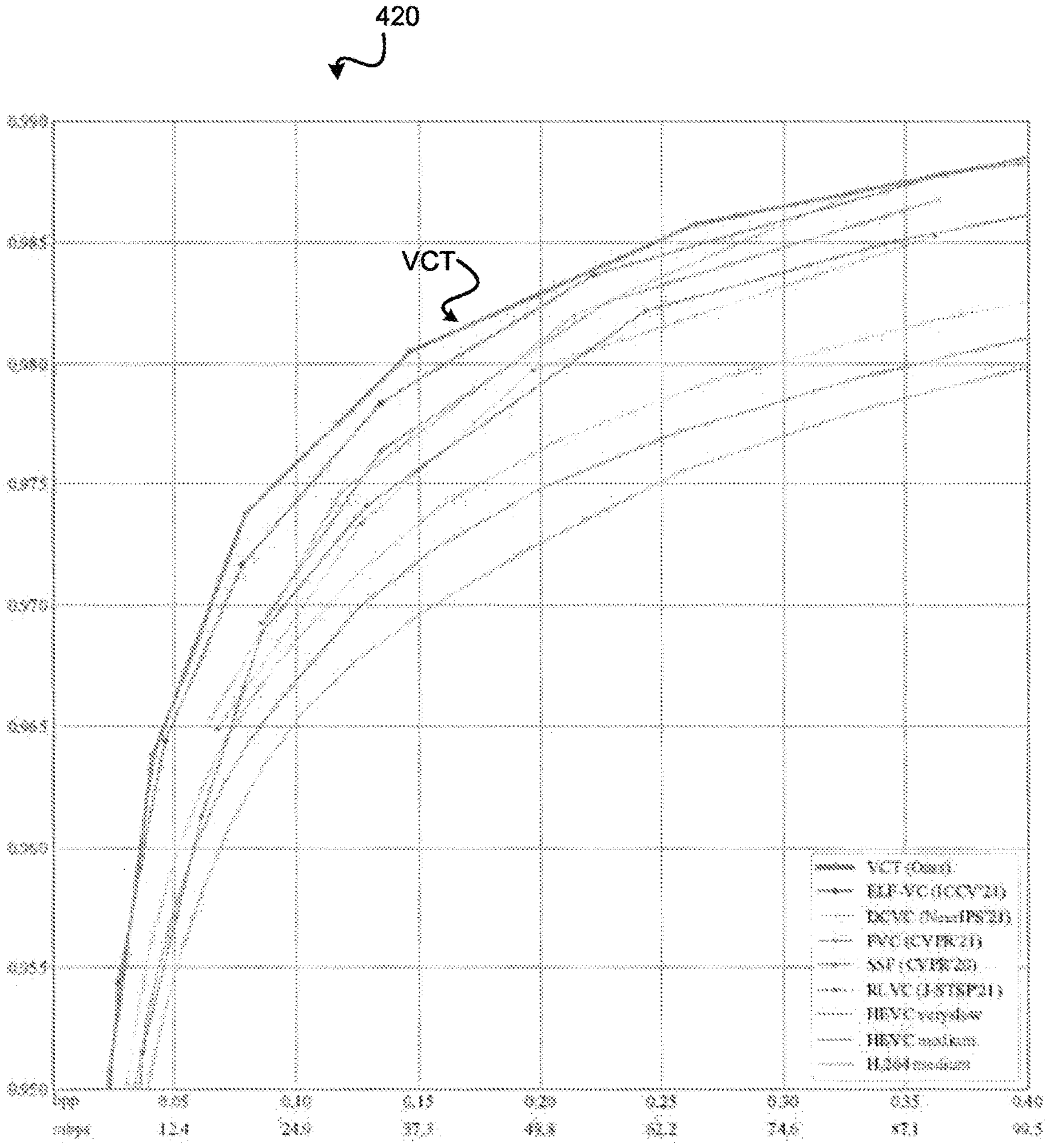
FIG. 4D illustrates example rate distortions, in accordance with example embodiments.

FIG. 3 illustrates example operations of a transformer 300, in accordance with example embodiments. Transformer 300 may be configured to operate on a set of blocks and/or tokens, such as already transmitted blocks 310, denoted as $b_{i-1}$, $b_{i-2}$, and to be transmitted block (or given block) 315, denoted as $b_i$ (obtained as illustrated in FIG. 2). A first magnified view 305 of a transformer layer (e.g., transformer 120 of FIG. 1) is illustrated, and a second magnified view 320 of a masked transformer layer (e.g., masked transformer 125 of FIG. 1) is illustrated. Temporal information 310C, denoted as $z_{joint}$, may be extracted from already transmitted blocks 310. As illustrated, masked transformer 315A $T_{cur}$ predicts probability mass function (PMF) 315B, $P(t_3|t_S, t_1, t_2, z_{joint})$, where $t_S$ is a learned start token. Accordingly, the predicting of the PMF may be based on a spatial context and a temporal context derived from the overlapping blocks. In what follows, these steps are described in greater detail.

Step 1: Temporal Mixer

Some embodiments involve extracting, by a first transformer, separately from each of the overlapping blocks, temporal information corresponding to the one or more quantized representations that occur prior to the given quantized representation. For example, two transformers may be used to extract temporal information from $b_{i-2}$, $b_{i-1}$. A first transformer 310A, $T_{sep}$, may operate separately on each previous block, already transmitted 310. Then, the outputs in the token dimension may be concatenated. Some embodiments involve mixing, by a second transformer, the extracted temporal information. For example, the second transformer 310B, $T_{joint}$, may be applied to the result to mix information across time. The output is temporal information 310C $z_{joint}$, that may comprise $$2w_P^2$$

features, indicating past knowledge of the model.

Step 2: Within-Block-Autoregression

The second part of the described method may involve a masked transformer 315A, $T_{cur}$, which may be configured to predict one or more PMFs 315B for each token using auto-regression within the block. Masked transformer 315A, $T_{cur}$ may be conditioned on temporal information 310C $z_{joint}$ as well as the previously transmitted tokens within the block.

For entropy coding, both the sender device and the receiver device may be configured to obtain the same PMFs 315B, i.e., masked transformer 315A, $T_{cur}$ may be configured to be causal and start from a known initialization point. Accordingly, a start token $t_S$ may be learned as a known initialization point.

In some embodiments, in order to transmit the tokens, temporal information 310C, $z_{joint}$ may be determined. Subsequently, $[t_S]$ may be input to masked transformer 315A, $T_{cur}$ resulting in a first PMF $P(t_1|t_S; z_{joint})$. Subsequently, entropy coding may be used to store the $d_C$ symbols in token $t_1$ into a bitstream using the first PMF $P(t_2|t_1, t_S; z_{joint})$. Then, $[t_S, t_1]$ may be input resulting in a second PMF $P(t_2|t_1, t_S; z_{joint})$, $t_2$ may be stored in the bitstream, and the process may be continued iteratively.

The receiver or decoding device may receive the resulting bitstream and may receive the same distributions, and thereby the tokens, by first inputting $[t_S]$ to masked transformer 315A, $T_{cur}$, determining a first PMF $P(t_1|t_S; z_{joint})$, entropy decoding $t_1$ from the bitstream, and then inputting $[t_S, t_1]$ to determine a second PMF $P(t_2|t_1, t_S; z_{joint})$, the process may be continued iteratively. FIG. 3 illustrates this process for $P(t_3| \ldots)$.

In some embodiments, the process may be run in parallel over the blocks. Accordingly, $y_i$ may be transmitted and/or received by running $$T_{cur} w_C^2 = 16 \text{ times.}$$

Each run may generally generate number of distributions given by $$\left\lceil \frac{H}{w_C} \right\rceil \cdot \left\lceil \frac{W}{w_C} \right\rceil \cdot d_C.$$

To ensure causality of $T_{cur}$ during training, the self-attention blocks may be masked.

Independence

Apart from assuming blocks in $y_i$ are independent, as each token is a vector, the symbols within each token may also be assumed to be conditionally independent given previous tokens, i.e., $T_{cur}$ can predict the $d_C$ distributions required for a token. In some embodiments, a joint distribution over all possible $|\mathcal{S}|^{d_C}$ realizations may be predicted, and channel-autoregression, and/or vector quantization may be used on tokens. In contrast to autoregressive image compression entropy models, the VCT based on transformer models described herein do not rely on additional side information.

Example Architectures

Transformers

As illustrated in FIG. 3, the transformers may be based on various architectures. In some embodiments, the $d_C$-dimensional tokens may be projected to a dr-dimensional space (e.g., d=768 in one example model) using one fully connected layer, and adding a learned positional embedding. While both $T_{sep}$ 310A and $T_{joint}$ 310B may include one or more stacks of multi-head self-attention (MHSA) layers, $T_{cur}$ 315A may be configured to use masked "conditional" transformer layers. For example, these layers may alternate between masked MHSA layers and MHSA layers that use $z_{joint}$ as keys (K) and values (V), as shown in FIG. 3. In some embodiments, six (6) transformer layers may be used for $T_{sep}$ 310A, four (4) for $T_{joint}$ 310B, and five (5) masked transformer layers for $T_{cur}$ 315A. Also, for example, sixteen (16) attention heads may be used. Also, in some embodiments, a separate temporal positional embedding may be learned to add to the input of $T_{joint}$ 310B.

Image Encoder and Decoder

In some embodiments, the image encoder and/or decoder E, D may comprise one or more architectures based on standard image compression approaches. For example, the image encoder and/or decoder E, D may be a CNN based image encoder and/or decoder. For example, the encoder, E, may include four (4) strided convolutional layers, downscaling by a factor 16 times in total. For the decoder, D, transposed convolutions may be used, and residual blocks at low resolutions may be optionally added. In some embodiments, $d_{ED}$=192 filters may be used for one or more layers.

One or more variants of the architecture may be used as well. For example, the following architectures may be used for the image encoder and/or decoder E, D. Let $\mathcal{C}$ denote a 5×5 convolution with $d_{ED}$=192 filters and a stride of two (2), followed by a leaky ReLu activation (e.g., with $\alpha$=0.2). In some embodiments, the encoder E, may comprise an arrangement of four such convolutions $\mathcal{CCCC}$. Let T denote a 5×5 transposed convolution with $d_{ED}$ filters and a stride of two (2), also followed by a leaky ReLu, and let R denote a residual block (i.e., R may comprise an arrangement of two convolutions $\mathcal{CC}$, with a skip connection around it). The decoder D, may comprise an arrangement such as RRRRTRRTRRTT. Accordingly, an increase in resolution can result in fewer residual blocks. In some examples, a shorthand 4220 may be used, counting the residual blocks R, between each transposed convolution T, in the arrangement RRRRTRRTRRTT.

Example Loss and Training Processes

The aforementioned modeling choices can enable an efficient training procedure. In some embodiments, the training may comprise three stages, which enables rapid experimentation.

In some embodiments, the training of the encoder E and/or the decoder D may be based on a rate-distortion trade-off loss. For example, in Stage I, the per-frame encoder E and decoder D may be trained by minimizing the rate-distortion trade-off. Let $\mathcal{U}$ denote a uniform distribution in the interval [−0.5, 0.5]. The following loss function may be minimized:

$$\mathcal{L}_I = \mathbb{E}_{x \sim p_X, u \sim \mathcal{U}}[-\log p(\tilde{y} + u) + \lambda MSE(x, \hat{x})], \quad \text{(Eqn. 1)}$$

Where the expression $-\log p(\tilde{y}+u)$ denotes a bitrater, and the expression $MSE(x, \hat{x})$ denotes a distortion d, and where $\tilde{y}=E(x)$, $\hat{x}=D(\text{round}_{STE}(\tilde{y}))$. Generally, the term $\tilde{y}$ refers to an unquantized representation, and the term $x \sim p_x$ represent frames drawn from the training set. Generally speaking, Eqn. 1, represents a minimization of a reconstruction error under the constraint that the encoder output may be effectively quantized, with the parameter λ maintaining a tradeoff. For Stage I, a mean-scale hyperprior approach may be utilized to estimate p. In some embodiments, the hyperprior estimates the PMF of y using a variational autoencoder (VAE), by predicting $p(y|z)$, where z represents a side information that is transmitted initially. To enable end-to-end training, independent and identically distributed (i.i.d.) uniform noise u may be added to $\tilde{y}$ when determining r, and a straight-through estimation (STE) for gradients may be utilized when rounding y to feed it to the decoder D.

For Stage II, the transformer may be trained to obtain p, and the rate may be minimized based on the following relationship:

$$\mathcal{L}_{II} = \mathbb{E}_{(x_1,x_2,x_3)\sim p_{X_{1:3}},u\sim\mathcal{U}}[-\log p(\tilde{y}_3 + u|y_1, y_2)] \quad \text{(Eqn. 2)}$$

where $\tilde{y}_i=E(x)$, $y_i=\text{round}(\tilde{y}_i)$, and where $(x_1, x_2, x_3)\sim p_{X_{1:3}}$ represent triplets of adjacent video frames. In some embodiments, one or more of the $d_C$ unquantized elements in each token may be assumed to follow a Gaussian distribution $p\sim\mathcal{N}$, and the transformer may be configured to predict $d_C$ number of means and $d_C$ number of scales per token. Finally, a fine-tuning process may be jointly applied in Stage III, adding the distortion loss d from Eqn. 1 to Eqn. 2.

In some embodiments, the model may be trained from scratch and some performance improvements may be achieved. For example, the training in Stage III may be performed directly from scratch, using a learning rate (LR) of $1E^{-4}$ for 750 k steps. In the event that the main encoder E and decoder D exhibit unstable training when trained from scratch, a light-weight architecture such as an Efficient learned image compression (ELIC) (e.g., with unevenly grouped space-channel contextual adaptive coding) may be utilized. Also, for example, training of a hyperprior may not be needed in this setup.

In some embodiments, a discrete PMF, P, for quantized symbols (e.g., for entropy coding) may be determined by convolving p with a unit-width box and evaluated at discrete points, as below:

$$P(y) = \int_{u\in\mathcal{U}} p(y+u)du, \quad y \in \mathbb{Z} \quad \text{(Eqn. 3)}$$

In some embodiments, training may be performed based on random spatio-temporal crops with parameters (B, $N_F$, 256, 256, 3) pixels, where B denotes a batch size, and $N_F$ denotes the number of frames. A linearly decaying LR may be utilized to schedule with warmup, where a warmup may be performed for 10 k steps and a linearly decay applied from the LR to $1E^{-5}$. In some embodiments, the training in Stage I may be based on a parameter λ=0.01. Also, for example, in order to navigate the rate-distortion trade-off and obtain results for multiple rates, nine (9) models may be finetuned in Stage III, using the parameter $\lambda=0.01\cdot 2^i$, $i\in\{-3, \ldots, 5\}$. In some embodiments, one or more of these models may be trained on four (4) Google Cloud TPUv4 chips.

Latent Residual Predictor (LRP)

In some embodiments, to further enhance the representation learned by the transformer, image compression techniques such as a latent residual predictor (LRP) may be used. Accordingly, the output features $z_{cur}$ from $T_{cur}$ comprise the same spatial dimensions as $y_i$, and, at a given time, the output features $z_{cur}$ may represent a knowledge of the transformer with regards to current and previous representations with respect to the given time. The output features $z_{cur}$ may be utilized to determine P, and these output features may be considered to constitute "free" additional features that may be helpful to reconstruct $\hat{x}_i$. Accordingly, $z_{cur}$ may be utilized by inputting $$y_i' = y_i + f_{LRP}(z_{cur})$$

to D (e.g., this may be enabled in Stage III), where $f_{LRP}$ may comprise a 1×1 convolution mapping from $d_T$ to $d_{ED}$ followed by a residual block. Accordingly, $$\hat{x}_i = D(y_i')$$

may indirectly depend on $y_{i-2}$, $y_{i-1}$, $y_i$. Since this is a bounded window into the past and $$y_i'$$

does not depend on $\hat{x}_{j<i}$, the process remains free from temporal error propagation, which is a significant technical advancement.

Experiments

Data Sets

In some embodiments, the training may be performed on one million Internet video clips, where each clip may include nine (9) frames. For example, high-resolution videos may be downscaled with a random factor (removing previous compression artifacts), from which a central 256 crop dataset may be obtained. In some embodiments, the training batches may comprise of randomly selected triplets of adjacent frames. Also, for example, evaluation may be performed on common benchmark data sets, such as (1) MCL-JCV dataset comprising thirty 1080p videos captured at either 25 FPS or 30 FPS and averaging 137 frames per video, and (2) UVG dataset comprising twelve 1080p 120 FPS videos with either 300 or 600 frames each.

Synthetic Videos

Figure 5:
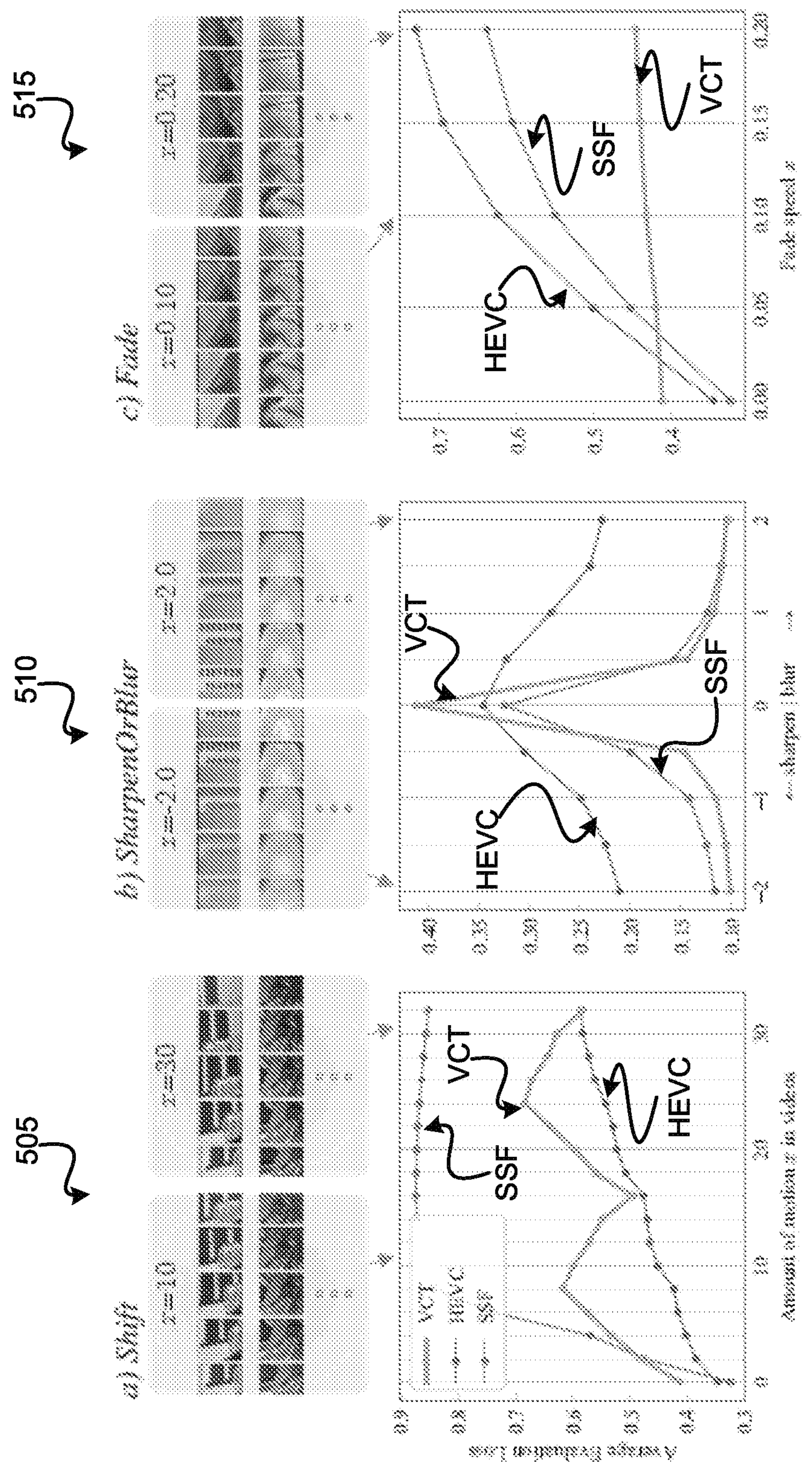
FIG. 5 illustrates example comparisons with other models, in accordance with example embodiments.

In some embodiments, synthetic datasets may be generated. For example, three parameterized synthetic datasets may be determined by generating videos from still images from the Challenge on Learned Image Compression (CLIC2020) test set (as illustrated in FIG. 5). As a particular example, a dataset can include a parameter x that can be variable, and for each value of x, a number of videos (e.g., 100 videos) may be generated. Also, for example, each video may include 12 frames of 512×512 pixels (px). Several image operations may be used to generate the datasets, such as (i) a Shift operation where panning may be performed from the center of an image towards the lower right of the image, shifting by x pixels at each step; (ii) a SharpenOrBlur operation where when $x \geq 0$, a Gaussian blurring may be applied with sigma $x \cdot t$ at time step t, and when $x<0$, videos that get sharper over time may be generated by playing a video blurred with $|x|$ in reverse; and (iii) a Fade operation where a linear transition between two unrelated images may be performed based on alpha blending (e.g., as in a scene cut).

Models

Several comparisons may be performed to evaluate the VCT models described herein. For example, a non-neural, standard codec high efficiency video coding (HEVC) using the FFmpeg×265 codec in the "medium" and "very slow" settings may be run, as well as H.264 video format using ×264 in the "medium" setting may be run. For a fair comparison with VCT models, B-Frames may be disabled without constraining the codecs in other ways. A public DVC code may be run, and additional numbers may be obtained from available literature that introduce for example, scale-space-flow, an architectural component to support warping and blurring, a neural method run on MCL-JCV (e.g., Efficient Learned Flexible-Rate Video Coding (ELF-VC)), which extends the motion compensation of Scale-space flow (SSF) with more motion priors, models based on warping plus residual coding in a representation space (e.g., a deep video compression technique in feature space (FVC) and Deep contextual video compression (DCVC)), using convolutional long short-term memory (ConvLSTM) as a sequence model (e.g., recurrent learning for Video Compression (RLVC) with Recurrent Auto-Encoder and Recurrent Probability Model), and/or additional models that study lossless transmission of representations using CNNs for temporal entropy modeling. Behavior of architectural biases on synthetic data may be observed by reproducing SSF, based on the same training data as for VCT. In some embodiment, the common peak signal-to-noise ratio (PSNR) and multi-scale structural similarity (MS-SSIM) may be evaluated in RGB. As used herein, the term "PSNR" generally refers to a ratio between the maximum possible value (power) of a signal and the power of distorting noise that affects the quality of its representation. As used herein, the term "MS-SSIM" generally refers to an SSIM conducted over multiple scales (MS) through a process of multiple stages of sub-sampling. Generally, a value closer to 1 indicates a higher image quality and a value closer to 0 indicates a lower image quality. Also, for example, the models may be trained using MSE as a distortion and the expression $200 \cdot (1-\text{MS-SSIM}(x, \hat{x}))$ may be used as a training objective in Stage III (see FIG. 7A) to obtain MS-SSIM models.

Results

Model Comparisons

FIGS. 4A-4D illustrate example rate distortions, in accordance with example embodiments. Rate-distortion comparisons are illustrated on MCL-JCV dataset (≈27 FPS) in graph 405 of FIG. 4A and graph 415 of FIG. 4C, and UVG dataset (≈120 frames per second (FPS)) in graph 410 of FIG. 4B and graph 420 of FIG. 4D. The MCL-JCV dataset may include twenty-four (24) source videos at a resolution 1920×1080 and 51 H.264/AVC encoded clips for each source sequence. UVG dataset can include a set of 4K 120 FPS test sequences made available for download in raw format and in elementary HEVC, Moving Picture Experts Group-4 (MP4), transport stream (TS), and Dynamic Adaptive Streaming over HTTP (DASH) streams for playback. As illustrated, bits per pixel (bpp) and megabits per second (mbps) are reported. Graph 405 illustrates PSNR for the MCL-JCV dataset, and graph 410 illustrates PSNR for the UVG dataset. Graph 415 illustrates MS-SSIM for the MCL-JCV dataset, and graph 420 illustrates MS-SSIM for the UVG dataset. As the figures indicate, despite the simplicity of VCT, and the fact that no motion or warping components are utilized, VCT generally outperforms other methods in both PSNR and MS-SSIM.

Synthetic Data

FIG. 5 illustrates example comparisons with other models, in accordance with example embodiments. The synthetic data sets introduced herein may be used to demonstrate how the transformer learns to exploit various types of temporal patterns. Also, for example, the evaluation R-D loss based on the expression $\mathcal{L}=r+\lambda d$ may be used for comparisons. To determine $\mathcal{L}$ for HEVC, a quality factor q matching the parameter $\lambda$ may be determined via the relationship $$q = \arg\min_{q} r(q) + \lambda d(q),$$

which yields q=25 for $\lambda=0.01$. To understand the types of temporal patterns a transformer has learned to leverage, videos representing commonly seen patterns may be synthesized. Example comparisons are illustrated with HEVC, which has built-in support for shifting motion, and SSF, which has built-in support for shifting motion and blurring. The VCT model described herein can learn to analyze patterns purely from data. For each dataset, different values for the parameter x (as described under "Experiments" above) may be used, and a point in the plot represents the average evaluation loss over the 100 videos created with x.

The learning of the transformer may be analyzed in different ways. For example, on videos with shifting based motion, VCT obtains ≈45% lower R-D loss compared to SSF, which saturates at about x=10, presumably due to the shallow CNN used for flow estimation. Since HEVC supports motion compensating with arbitrary shifts of previous frames, it appears to perform well on these kinds of videos. For shifts that are a multiple of 16, the representations shift by one (1) symbol at each step, and VCT matches HEVC. This may be due to the encoder in VCT being based a CNN; accordingly, it is shift-equivariant for shifts that are multiples of the stride (16). However, a shift in [1, 15] pixels may cause the representation to change in a complex manner.

Also, for example, for blurring and/or sharpening, VCT generally outperforms both HEVC and SSF, despite the latter having explicit support for blurring. Note that the curve for SSF is asymmetric: since it has built-in support for blurring, it gets a ≈20% lower R-D loss on blurring compared to sharpening.

As another example, VCT can also learn to manage fading, exhibiting a near-constant R-D loss as the variable x is increased, in contrast to the baselines, neither of which has an explicit support for fading. For example, SSF is ≈20% better than HEVC, possibly due to its blurring capabilities. Overall, synthetic data appears to provide improved insights into the strengths of VCT over other methods.

Graph 505 illustrates Shift, where panning is performed from the center of an image towards the lower right, shifting by x pixels in each step. Graph 510 illustrates SharpenOrBlur, where if $x \geq 0$, a Gaussian blurring may be applied with sigma $x \cdot t$ at time step t. If $x<0$, videos that get sharper over time may be created by playing a video blurred with $|x|$ in reverse. Graph 515 illustrates Fade, where a linear transition is performed between two unrelated images using alpha blending (as in a scene cut). The green curve represents data for the VCT model described herein.

Visualizing Certainty During Decoding

As described herein, after having observed k tokens in each block, the transformer can predict a PMF $P(t_{k+1}|t_{\leq k}, z_{joint})$. Generally, this enables the transformer to determine a joint distribution $P(t_{>k}| \ldots)$ over all unobserved (e.g., not yet decoded) tokens. Generally speaking, as the transformer becomes more predictive about the future, the distribution becomes concentrated on the actual future tokens to be decoded by the transformer.

Figure 6:
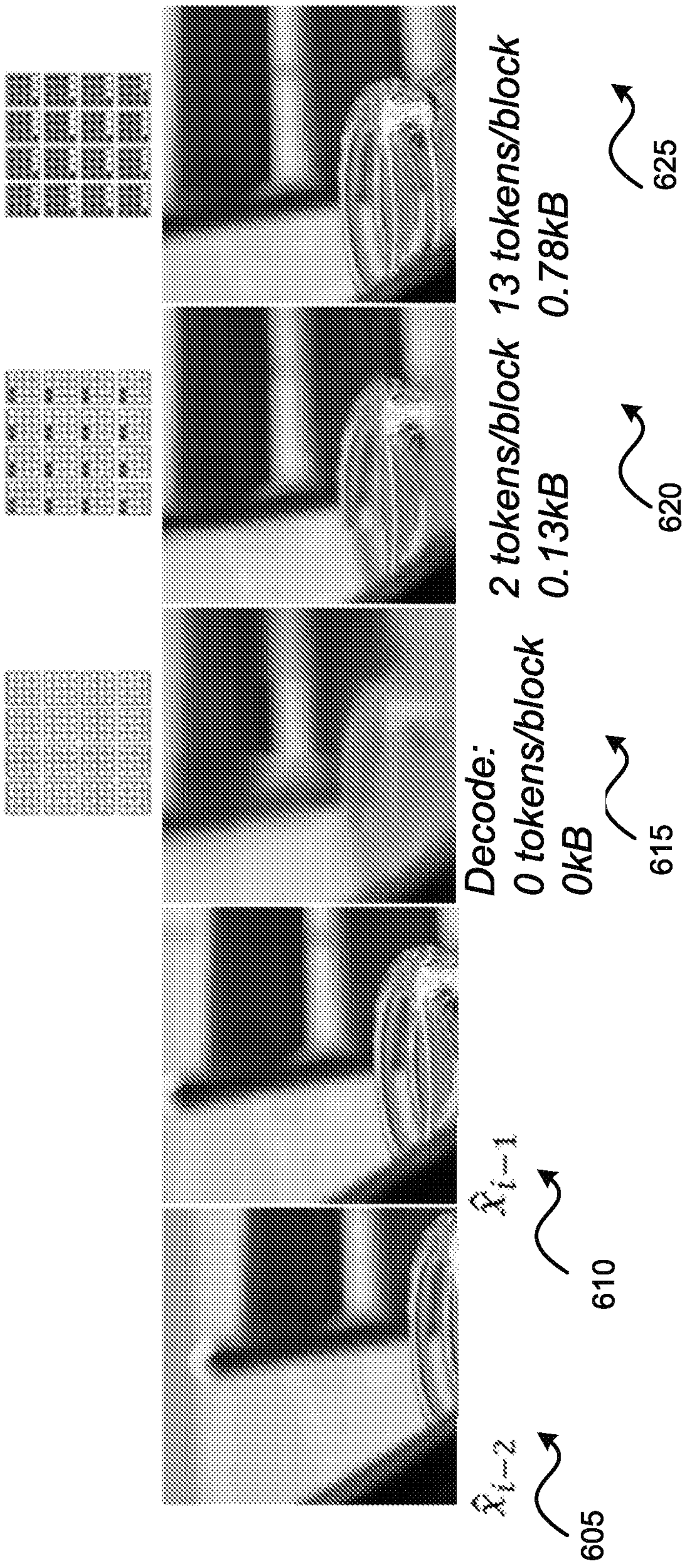
FIG. 6 illustrates an example visualization of a sample mean from a block-autoregressive distribution predicted by a transformer, in accordance with example embodiments.

FIG. 6 illustrates an example visualization of a sample mean from a block-autoregressive distribution predicted by a transformer, in accordance with example embodiments. In FIG. 6, the sample mean of a distribution may be visualized by inputting it through the decoder D. For example, N realizations of the unseen tokens may be sampled in each block, conditioned on the k already decoded tokens, for $k \in \{0, 2, 13\}$. The middle image 615 in FIG. 6 illustrates what the transformer expects at a current frame, before decoding any information (k=0, i.e., 0 bits).

In some embodiments, the model appears to be capable of implicitly learning second order motion. For example, the kilobytes (kB) required to transmit the decoded (gray) tokens are illustrated. Two previous reconstructions, $\hat{x}_{i-2}$, labeled as 605, and $\hat{x}_{i-1}$, labeled as 610, are shown. The middle image, at 615, illustrates what the transformer expects at the current frame, before decoding any information (OkB). The next two images at 620 and 625 illustrate that as more tokens are decoded, the predictive capability of the model is enhanced, and the image obtained from the sample mean appears to sharpen. Note that sampling from the model does not have to be performed for actual video coding.

FIG. 7A illustrates a table 700A for three stages of the training, in accordance with example embodiments. For example, training may be split in three stages (e.g., Stages I, II, and Ill as previously described) for training efficiency (note the steps/s column). As previously described, parameter, λ, manages a rate-distortion trade-off, r denotes a bitrate, d denotes distortion, B denotes batch size, and NF denotes a number of frames.

Ablations

FIG. 7B illustrates a table 700B for experimental results for the number of previous frames to be input to the transformer, in accordance with example embodiments. Table 700B illustrates ablation based on how many previous frames are input to the transformer ("context"), and whether LRP is used. An effect of temporal context from previous frames and LRP may be observed on MCL-JCV. For example, the process may be initiated from a baseline that does not use any previous frames, i.e., an image model, used to independently code each frame. Conditioning on one previous frame reduces bitrate by −58%. Using two previous frames yields an additional improvement of −6%. In one configuration of VCT, where LRP is added, an increase in PSNR of 0.7 dB at the same bitrate may be observed. Additional previous frames may generally not further enhance learning, making the model considerably simpler.

Runtime

FIG. 7C illustrates a table 700C for experimental runtime of the components, in accordance with example embodiments. Table 700C illustrates example runtimes of VCT components. For example, a Google Cloud Tensor Processing Unit (TPU) v4 may be used to run transformers and the decoder D. Entropy Coding (EC) may be run on a CPU. To obtain runtimes of the transformers ($T_{sep}$, $T_{joint}$, $T_{cur}$) and the decoder D, a Google Cloud TPU v4 (single core) using Flax may be deployed, which has an efficient implementation for autoregressive transformers. Also, for example, Tensorflow Compression may be used to measure time spent on entropy coding (EC), on an Intel Skylake CPU core. In FIG. 7C, the observed data for 1280×720 px, 852×480 px, and 480×360 px are displayed. In some embodiments, an FPS estimate may be determined based on the expression 1000/(sum of individual runtimes in ms). In some embodiments, running $T_{cur}$ at 720p once may take ≈2.8 ms; and this may be run $$w_C^2 = 16$$

times to decode a frame. In order to run $T_{joint}$, $T_{sep}$ may be run once per representation, as the output of running $T_{sep}$ on the previous representation may be re-used to run $T_{joint}$.

Several applications are possible. In one aspect, a plurality of successive input video frames can be transformed to a plurality of compressed video frames.

In some example embodiments, a user may capture video using a mobile device, and the successive input video frames can be transformed to a plurality of compressed video frames.

In some example embodiments, a user may save the compressed video frames in a video library. In other example embodiments, the user may transmit the compressed video frames to another server or device.

In some aspects, a user may receive the plurality of compressed video frames at another device, decompress them, and view them using a video player.

These and other example applications are contemplated within a scope of this disclosure.

Training Machine Learning Models for Generating Inferences/Predictions

Figure 8:
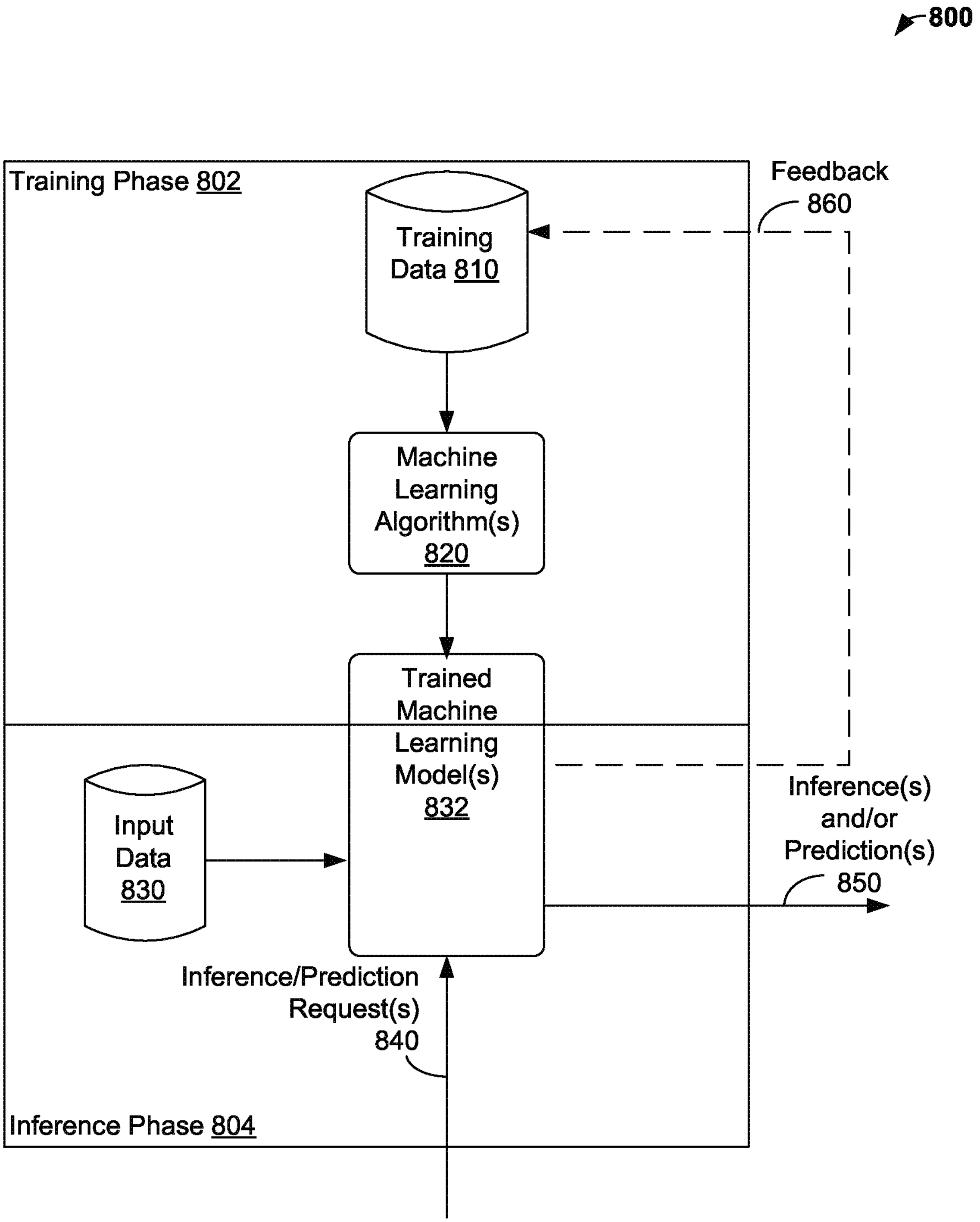
FIG. 8 is a diagram illustrating training and inference phases of a machine learning model, in accordance with example embodiments.

FIG. 8 shows diagram 800 illustrating a training phase 802 and an inference phase 804 of trained machine learning model(s) 832, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 8 shows training phase 802 where one or more machine learning algorithms 820 are being trained on training data 810 to become trained machine learning model 832. Then, during inference phase 804, trained machine learning model 832 can receive input data 830 and one or more inference/prediction requests 840 (perhaps as part of input data 830) and responsively provide as an output one or more inferences and/or predictions 850.

As such, trained machine learning model(s) 832 can include one or more models of one or more machine learning algorithms 820. Machine learning algorithm(s) 820 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 820 may be supervised or unsupervised, and may implement any suitable combination of online and offline learning.

In some examples, machine learning algorithm(s) 820 and/or trained machine learning model(s) 832 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 820 and/or trained machine learning model(s) 832. In some examples, trained machine learning model(s) 832 can be trained, may reside and may be executed to provide inferences on a particular computing device, and/or otherwise can make inferences for the particular computing device.

In some aspects, training data 810 can include one million Internet video clips, where each clip has nine frames. High-resolution videos may be obtained and downscaled with a random factor (removing previous compression artifacts). Accordingly, a central 256 crop may be generated. Training batches may be made up of randomly selected triplets of adjacent frames. In some implementations, more than three adjacent frames may be used.

During training phase 802, machine learning algorithm(s) 820 can be trained by providing at least training data 810 as training input using unsupervised, supervised, semi-supervised, and/or reinforcement learning techniques. Unsupervised learning involves providing a portion (or all) of training data 810 to machine learning algorithm(s) 820 and machine learning algorithm(s) 820 determining one or more output inferences based on the provided portion (or all) of training data 810. Supervised learning involves providing a portion of training data 810 to machine learning algorithm(s) 820, with machine learning algorithm(s) 820 determining one or more output inferences based on the provided portion of training data 810, and the output inference(s) are either accepted or corrected based on correct results associated with training data 810. In some examples, supervised learning of machine learning algorithm(s) 820 can be governed by a set of rules and/or a set of labels for the training input, and the set of rules and/or set of labels may be used to correct inferences of machine learning algorithm(s) 820.

Semi-supervised learning involves having correct results for part, but not all, of training data 810. During semi-supervised learning, supervised learning is used for a portion of training data 810 having correct results, and unsupervised learning is used for a portion of training data 810 not having correct results. Reinforcement learning involves machine learning algorithm(s) 820 receiving a reward signal regarding a prior inference, where the reward signal can be a numerical value. During reinforcement learning, machine learning algorithm(s) 820 can output an inference and receive a reward signal in response, where machine learning algorithm(s) 820 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 820 and/or trained machine learning model(s) 832 can be trained using other machine learning techniques, including but not limited to, incremental learning and curriculum learning.

In some examples, machine learning algorithm(s) 820 and/or trained machine learning model(s) 832 can use transfer learning techniques. For example, transfer learning techniques can involve trained machine learning model(s) 832 being pre-trained on one set of data and additionally trained using training data 810. More particularly, machine learning algorithm(s) 820 can be pre-trained on data from one or more computing devices and a resulting trained machine learning model provided to computing device CD1, where CD1 is intended to execute the trained machine learning model during inference phase 804. Then, during training phase 802, the pre-trained machine learning model can be additionally trained using training data 810, where training data 810 can be derived from kernel and non-kernel data of computing device CD1. This further training of the machine learning algorithm(s) 820 and/or the pre-trained machine learning model using training data 810 of CD1's data can be performed using either supervised or unsupervised learning. Once machine learning algorithm(s) 820 and/or the pre-trained machine learning model has been trained on at least training data 810, training phase 802 can be completed. The trained resulting machine learning model can be utilized as at least one of trained machine learning model(s) 832.

In particular, once training phase 802 has been completed, trained machine learning model(s) 832 can be provided to a computing device, if not already on the computing device. Inference phase 804 can begin after trained machine learning model(s) 832 are provided to computing device CD1.

During inference phase 804, trained machine learning model(s) 832 can receive input data 830 and generate and output one or more corresponding inferences and/or predictions 850 about input data 830. As such, input data 830 can be used as an input to trained machine learning model(s) 832 for providing corresponding inference(s) and/or prediction(s) 850 to kernel components and non-kernel components. For example, trained machine learning model(s) 832 can generate inference(s) and/or prediction(s) 850 in response to one or more inference/prediction requests 840. In some examples, trained machine learning model(s) 832 can be executed by a portion of other software. For example, trained machine learning model(s) 832 can be executed by an inference or prediction daemon to be readily available to provide inferences and/or predictions upon request. Input data 830 can include data from computing device CD1 executing trained machine learning model(s) 832 and/or input data from one or more computing devices other than CD1.

Input data 830 can include a collection of videos provided by one or more sources. The collection of images can include video frames, videos resident on computing device CD1, and/or other videos.

Inference(s) and/or prediction(s) 850 can include output images, output intermediate images, numerical values, and/or other output data produced by trained machine learning model(s) 832 operating on input data 830 (and training data 810). In some examples, trained machine learning model(s) 832 can use output inference(s) and/or prediction(s) 850 as input feedback 860. Trained machine learning model(s) 832 can also rely on past inferences as inputs for generating new inferences.

An encoder, a transformer, or a decoder based neural network can be an example of machine learning algorithm(s) 820. After training, the trained version of the neural network can be an example of trained machine learning model(s) 832. In this approach, an example of inference/prediction request(s) 840 can be a request to compress a video and a corresponding example of inferences and/or prediction(s) 850 can be an output compressed video.

In some examples, one computing device CD_SOLO can include the trained version of the neural network, perhaps after training. Then, the computing device CD_SOLO can receive a request to compress a video, and use the trained version of the neural network to generate the compressed video.

In some examples, two or more computing devices CD_CLI and CD_SRV can be used to provide compressed video; e.g., a first computing device CD_CLI can generate and send requests to compress a video to a second computing device CD_SRV. Then, CD_SRV can use the trained version of the neural network, to generate the compressed video, and respond to the requests from CD_CLI for the compressed video. Then, upon reception of responses to the requests, CD_CLI can provide the requested compressed video (e.g., using a user interface and/or a display, a video player, etc.).

Example Data Network

Figure 9:
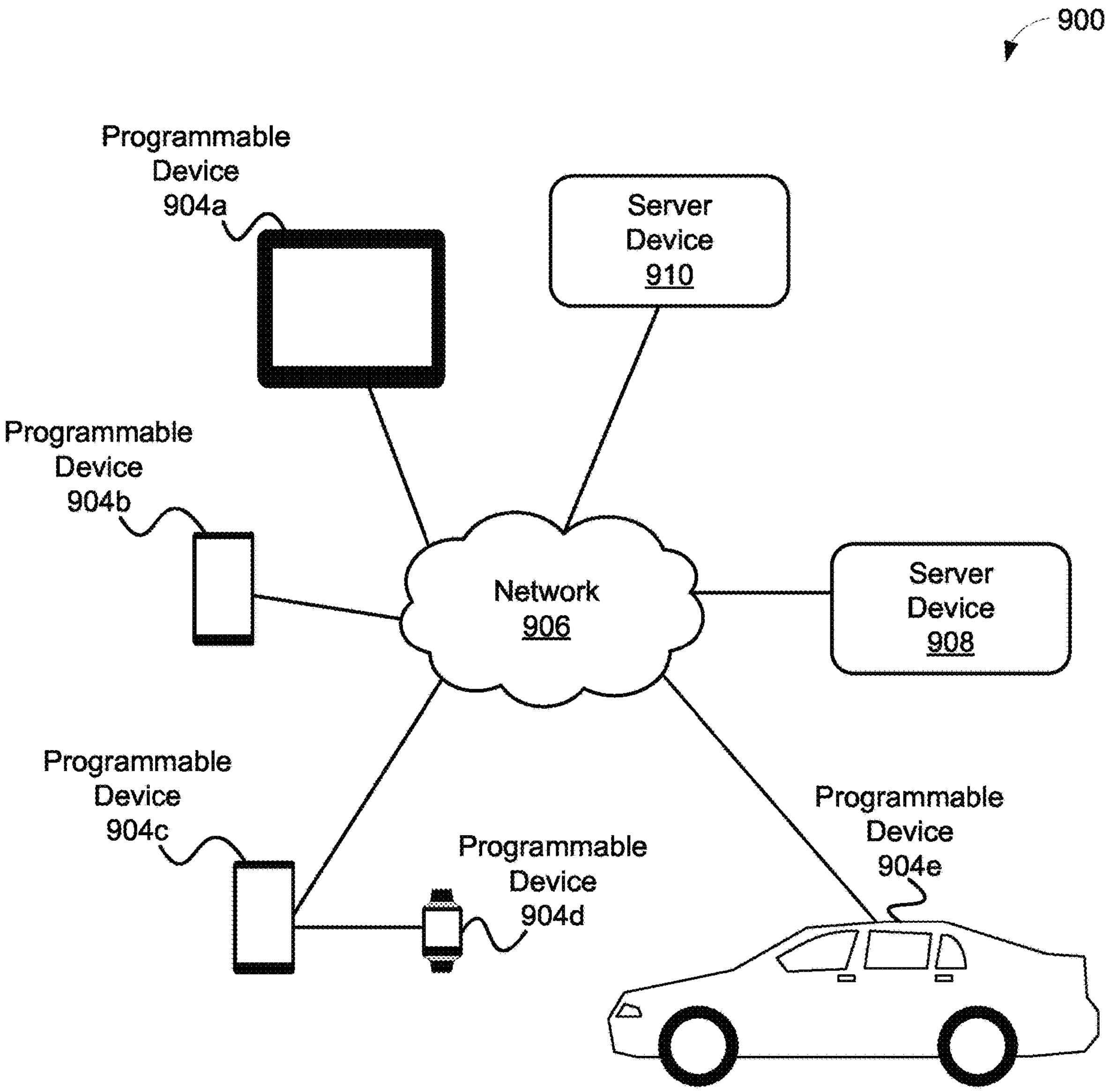
FIG. 9 depicts a distributed computing architecture, in accordance with example embodiments.

FIG. 9 depicts a distributed computing architecture 900, in accordance with example embodiments. Distributed computing architecture 900 includes server devices 908, 910 that are configured to communicate, via network 906, with programmable devices 904*a*, 904*b*, 904*c*, 904*d*, 904*e*. Network 906 may correspond to a local area network (LAN), a wide area network (WAN), a WLAN, a WWAN, a corporate intranet, the public Internet, or any other type of network configured to provide a communications path between networked computing devices. Network 906 may also correspond to a combination of one or more LANs, WANs, corporate intranets, and/or the public Internet.

Although FIG. 9 only shows five programmable devices, distributed application architectures may serve tens, hundreds, or thousands of programmable devices. Moreover, programmable devices 904*a*, 904*b*, 904*c*, 904*d*, 904*e* (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 904*a*, 904*b*, 904*c*, 904*e*, programmable devices can be directly connected to network 906. In other examples, such as illustrated by programmable device 904*d*, programmable devices can be indirectly connected to network 906 via an associated computing device, such as programmable device 904*c*. In this example, programmable device 904*c* can act as an associated computing device to pass electronic communications between programmable device 904*d* and network 906. In other examples, such as illustrated by programmable device 904*e*, a computing device can be part of and/or inside a vehicle, such as a car, a truck, a bus, a boat or ship, an airplane, etc. In other examples not shown in FIG. 9, a programmable device can be both directly and indirectly connected to network 906.

Server devices 908, 910 can be configured to perform one or more services, as requested by programmable devices 904*a*-904*e*. For example, server device 908 and/or 910 can provide content to programmable devices 904*a*-904*e*. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 908 and/or 910 can provide programmable devices 904*a*-904*e* with access to software for database, search, computation, graphical, audio, video, World Wide Web/Internet utilization, and/or other functions. Many other examples of server devices are possible as well.

Computing Device Architecture

Figure 10:
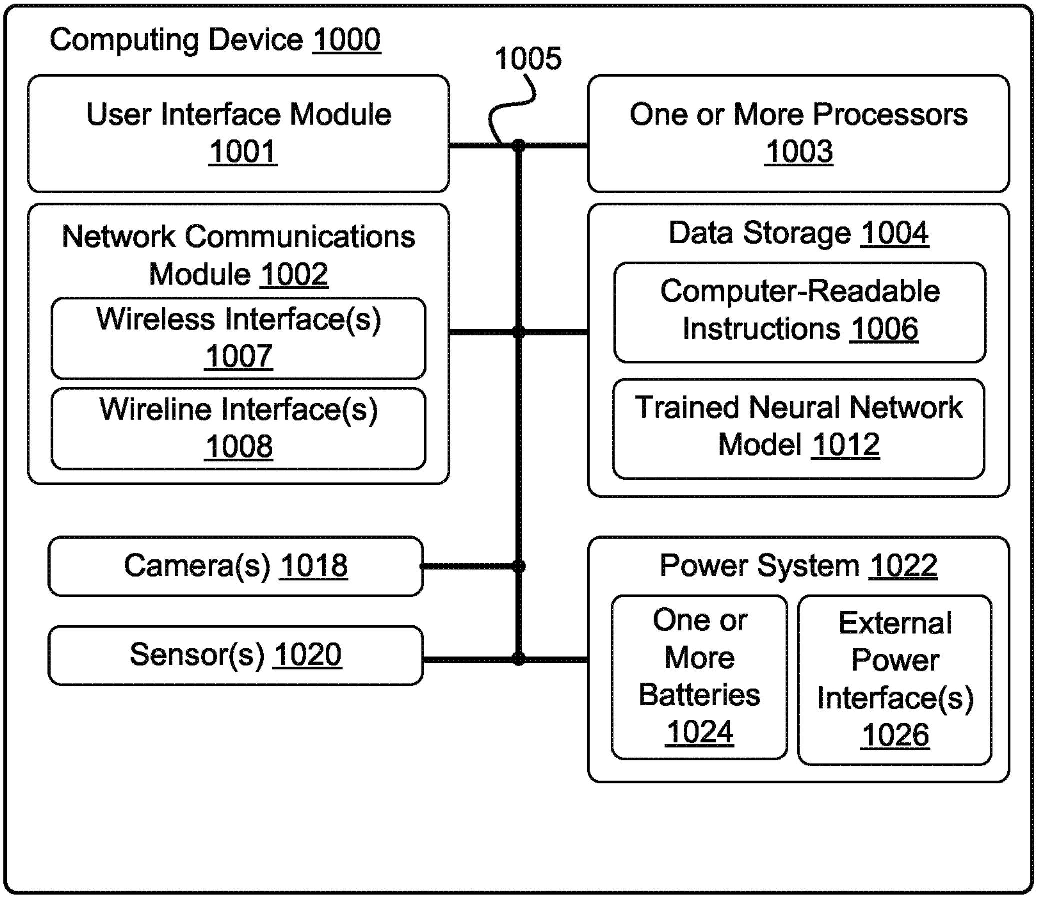
FIG. 10 is a block diagram of a computing device, in accordance with example embodiments.

FIG. 10 is a block diagram of an example computing device 1000, in accordance with example embodiments. In particular, computing device 1000 shown in FIG. 10 can be configured to perform at least one function of, and/or related to, a transformer based neural network 100, and/or method 1200. In some embodiments, computing device 1000 may include an encoder and/or a decoder to perform encoding and/or decoding, as described herein.

Computing device 1000 may include a user interface module 1001, a network communications module 1002, one or more processors 1003, data storage 1004, one or more cameras 1018, one or more sensors 1020, and power system 1022, all of which may be linked together via a system bus, network, or other connection mechanism 1005.

User interface module 1001 can be operable to send data to and/or receive data from external user input/output devices. For example, user interface module 1001 can be configured to send and/or receive data to and/or from user input devices such as a touch screen, a computer mouse, a keyboard, a keypad, a touch pad, a trackball, a joystick, a voice recognition module, and/or other similar devices. User interface module 1001 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1001 can also be configured to generate audible outputs, with devices such as a speaker, speaker jack, audio output port, audio output device, earphones, and/or other similar devices. User interface module 1001 can further be configured with one or more haptic devices that can generate haptic outputs, such as vibrations and/or other outputs detectable by touch and/or physical contact with computing device 1000. In some examples, user interface module 1001 can be used to provide a graphical user interface (GUI) for utilizing computing device 1000, such as, for example, a graphical user interface of a mobile phone device.

Network communications module 1002 can include one or more devices that provide one or more wireless interfaces 1007 and/or one or more wireline interfaces 1008 that are configurable to communicate via a network. Wireless interface(s) 1007 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 1008 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1002 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1003 can include one or more general purpose processors, and/or one or more special purpose processors (e.g., digital signal processors, tensor processing units (TPUs), graphics processing units (GPUs), application specific integrated circuits, etc.). One or more processors 1003 can be configured to execute computer-readable instructions 1006 that are contained in data storage 1004 and/or other instructions as described herein.

Data storage 1004 can include one or more non-transitory computer-readable storage media that can be read and/or accessed by at least one of one or more processors 1003. The one or more computer-readable storage media can include volatile and/or non-volatile storage components, such as optical, magnetic, organic or other memory or disc storage, which can be integrated in whole or in part with at least one of one or more processors 1003. In some examples, data storage 1004 can be implemented using a single physical device (e.g., one optical, magnetic, organic or other memory or disc storage unit), while in other examples, data storage 1004 can be implemented using two or more physical devices.

Data storage 1004 can include computer-readable instructions 1006 and perhaps additional data. In some examples, data storage 1004 can include storage required to perform at least part of the herein-described methods, scenarios, and techniques and/or at least part of the functionality of the herein-described devices and networks. In some examples, data storage 1004 can include storage for a trained neural network model 1012 (e.g., a model of trained neural networks such as an encoder, a transformer, a decoder). In particular of these examples, computer-readable instructions 1006 can include instructions that, when executed by processor(s) 1003, enable computing device 1000 to provide for some or all of the functionality of trained neural network model 1012.

In some embodiments, computing device 1000 may be a decoding device. Computer-readable instructions 1006 can include instructions that, when executed by processor(s) 1003, enable computing device 1000 to carry out functions. The functions may include receiving, by a decoder of the decoding device, a plurality of compressed video frames as a corresponding sequence of quantized representations. The functions may also include predicting, by a transformer of the decoding device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations. The functions may further include generating, by the decoding device, a plurality of decompressed video frames by applying, based on the predicted PMF, an entropy decoding to each quantized representation, wherein the entropy decoding comprises reversing an entropy encoding, and the entropy encoding having assigned a smaller number of bits to values with a higher frequency of occurrence. The functions may additionally include providing, by the decoding device, the plurality of decompressed video frames.

In some embodiments, an average number of bits corresponds to a cross-entropy of the conditional distribution with respect to the predicted PMF.

Some embodiments involve maintaining a decoding efficiency of the entropy decoding by adjusting the cross-entropy.

In some embodiments, the decoder may be a convolutional neural network (CNN) based image decoder.

Some embodiments involve applying neural image decompression to train the decoder to be a lossy transform, wherein a target distortion variable is based on a range of each quantized representation.

In some embodiments, the training of the decoder may be based on a rate-distortion trade-off loss.

In some embodiments, the at least one dependency may be a temporal dependency.

In some embodiments, the decoding device includes a video player, and the functions for providing the plurality of decompressed video frames involve outputting the plurality of decompressed video frames by the video player.

Some embodiments involve obtaining a trained version of the decoder and the transformer at the decoding device. The decoding may be performed by the trained version of the decoder. The predicting may be performed by the trained version of the transformer.

In some embodiments, the decoder may be trained at the decoding device.

Some embodiments involve storing the plurality of decompressed video frames at the decoding device.

In some embodiments, each frame of the plurality of compressed video frames may be independently decoded.

In some embodiments, the decoding device may be a mobile phone.

In some examples, computing device 1000 can include one or more cameras 1018. Camera(s) 1018 can include one or more image capture devices, such as still and/or video cameras, equipped to capture light and record the captured light in one or more images; that is, camera(s) 1018 can generate image(s) of captured light. The one or more images can be one or more still images and/or one or more images utilized in video imagery. Camera(s) 1018 can capture light and/or electromagnetic radiation emitted as visible light, infrared radiation, ultraviolet light, and/or as one or more other frequencies of light. Some embodiments may involve capturing the plurality of input video frames using the camera. For example, a video camera may capture a video for a scene. Such embodiments may also involve receiving, by the encoder, the plurality of input video frames from the camera. The captured frames may be sent to the encoder for compression based on the methods described herein.

In some examples, computing device 1000 can include one or more sensors 1020. Sensors 1020 can be configured to measure conditions within computing device 1000 and/or conditions in an environment of computing device 1000 and provide data about these conditions. For example, sensors 1020 can include one or more of: (i) sensors for obtaining data about computing device 1000, such as, but not limited to, a thermometer for measuring a temperature of computing device 1000, a battery sensor for measuring power of one or more batteries of power system 1022, and/or other sensors measuring conditions of computing device 1000; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 1000, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1000, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1000, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1020 are possible as well.

Power system 1022 can include one or more batteries 1024 and/or one or more external power interfaces 1026 for providing electrical power to computing device 1000. Each battery of the one or more batteries 1024 can, when electrically coupled to the computing device 1000, act as a source of stored electrical power for computing device 1000. One or more batteries 1024 of power system 1022 can be configured to be portable. Some or all of one or more batteries 1024 can be readily removable from computing device 1000. In other examples, some or all of one or more batteries 1024 can be internal to computing device 1000, and so may not be readily removable from computing device 1000. Some or all of one or more batteries 1024 can be rechargeable. For example, a rechargeable battery can be recharged via a wired connection between the battery and another power supply, such as by one or more power supplies that are external to computing device 1000 and connected to computing device 1000 via the one or more external power interfaces. In other examples, some or all of one or more batteries 1024 can be non-rechargeable batteries.

One or more external power interfaces 1026 of power system 1022 can include one or more wired-power interfaces, such as a USB cable and/or a power cord, that enable wired electrical power connections to one or more power supplies that are external to computing device 1000. One or more external power interfaces 1026 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1026, computing device 1000 can draw electrical power from the external power source the established electrical power connection. In some examples, power system 1022 can include related sensors, such as battery sensors associated with the one or more batteries or other types of electrical power sensors.

Cloud-Based Servers

Figure 11:
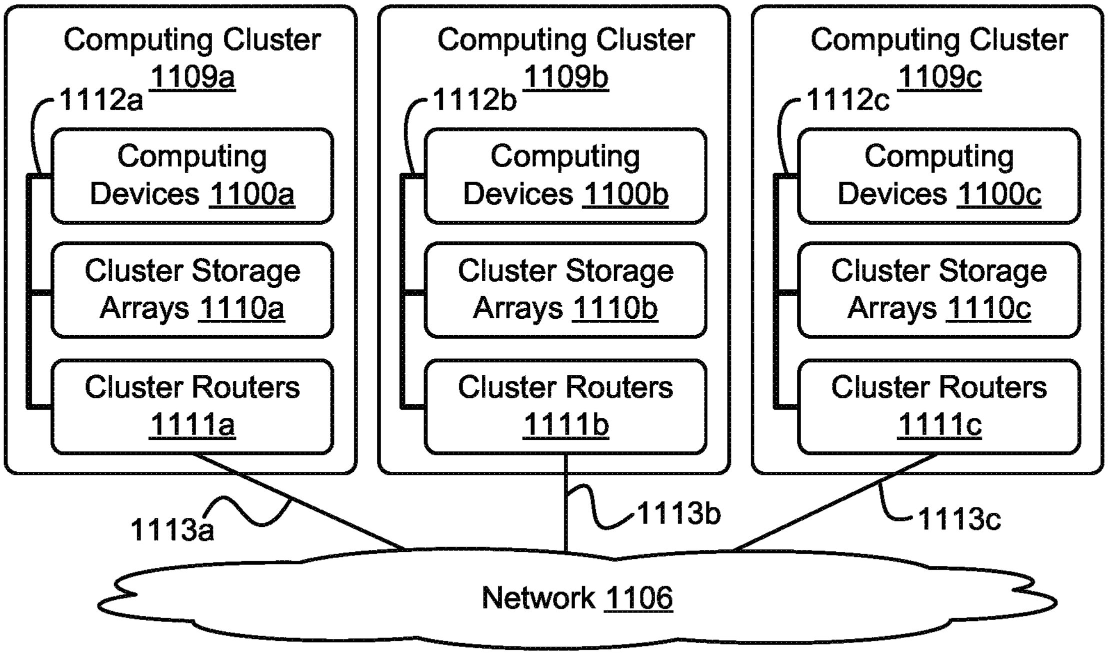
FIG. 11 depicts a network of computing clusters arranged as a cloud-based server system, in accordance with example embodiments.

FIG. 11 depicts a network 906 of computing clusters 1109*a*, 1109*b*, 1109*c* arranged as a cloud-based server system in accordance with an example embodiment. Computing clusters 1109*a*, 1109*b*, and 1109*c* can be cloud-based devices that store program logic and/or data of cloud-based applications and/or services; e.g., perform at least one function of and/or related to a neural network, an encoder, a transformer, a decoder, and/or method 2400.

In some embodiments, computing clusters 1109*a*, 1109*b*, and 1109*c* can be a single computing device residing in a single computing center. In other embodiments, computing clusters 1109*a*, 1109*b*, and 1109*c* can include multiple computing devices in a single computing center, or even multiple computing devices located in multiple computing centers located in diverse geographic locations. For example, FIG. 11 depicts each of computing clusters 1109*a*, 1109*b*, and 1109*c* residing in different physical locations.

In some embodiments, data and services at computing clusters 1109*a*, 1109*b*, 1109*c* can be encoded as computer readable information stored in non-transitory, tangible computer readable media (or computer readable storage media) and accessible by other computing devices. In some embodiments, computing clusters 1109*a*, 1109*b*, 1109*c* can be stored on a single disk drive or other tangible storage media, or can be implemented on multiple disk drives or other tangible storage media located at one or more diverse geographic locations.

FIG. 11 depicts a cloud-based server system in accordance with an example embodiment. In FIG. 11, functionality of an encoder, a transformer, a decoder, and/or a computing device can be distributed among computing clusters 1109*a*, 1109*b*, and 1109*c*. Computing cluster 1109*a* can include one or more computing devices 1100*a*, cluster storage arrays 1110*a*, and cluster routers 1111*a* connected by a local cluster network 1112*a*. Similarly, computing cluster 1109*b* can include one or more computing devices 1100*b*, cluster storage arrays 1110*b*, and cluster routers 1111*b* connected by a local cluster network 1112*b*. Likewise, computing cluster 1109*c* can include one or more computing devices 1100*c*, cluster storage arrays 1110*c*, and cluster routers 1111*c* connected by a local cluster network 1112*c*.

In some embodiments, each of computing clusters 1109*a*, 1109*b*, and 1109*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1109*a*, for example, computing devices 1100*a* can be configured to perform various computing tasks of an encoder, a transformer, a decoder, and/or a computing device. In one embodiment, the various functionalities of a neural network, and/or a computing device can be distributed among one or more of computing devices 1100*a*, 1100*b*, and 1100*c*. Computing devices 1100*b* and 1100*c* in respective computing clusters 1109*b* and 1109*c* can be configured similarly to computing devices 1100*a* in computing cluster 1109*a*. On the other hand, in some embodiments, computing devices 1100*a*, 1100*b*, and 1100*c* can be configured to perform different functions.

In some embodiments, computing tasks and stored data associated with a neural network, and/or a computing device can be distributed across computing devices 1100*a*, 1100*b*, and 1100*c* based at least in part on the processing requirements of a neural network, and/or a computing device, the processing capabilities of computing devices 1100*a*, 1100*b*, 1100*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1110*a*, 1110*b*, 1110*c* of computing clusters 1109*a*, 1109*b*, and 1109*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of an encoder, a transformer, a decoder, and/or a computing device can be distributed across computing devices 1100*a*, 1100*b*, 1100*c* of computing clusters 1109*a*, 1109*b*, 1109*c*, various active portions and/or backup portions of these components can be distributed across cluster storage arrays 1110*a*, 1110*b*, 1110*c*. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 1111*a*, 1111*b*, 1111*c* in computing clusters 1109*a*, 1109*b*, and 1109*c* can include networking equipment configured to provide internal and external communications for the computing clusters. For example, cluster routers 1111*a* in computing cluster 1109*a* can include one or more internet switching and routing devices configured to provide (i) local area network communications between computing devices 1100*a* and cluster storage arrays 1110*a* via local cluster network 1112*a*, and (ii) wide area network communications between computing cluster 1109*a* and computing clusters 1109*b* and 1109*c* via wide area network link 1113*a* to network 906. Cluster routers 1111*b* and 1111*c* can include network equipment similar to cluster routers 1111*a*, and cluster routers 1111*b* and 1111*c* can perform similar networking functions for computing clusters 1109*b* and 1109*b* that cluster routers 1111*a* perform for computing cluster 1109*a*.

In some embodiments, the configuration of cluster routers 1111*a*, 1111*b*, 1111*c* can be based at least in part on the data communication requirements of the computing devices and cluster storage arrays, the data communications capabilities of the network equipment in cluster routers 1111*a*, 1111*b*, 1111*c*, the latency and throughput of local cluster networks 1112*a*, 1112*b*, 1112*c*, the latency, throughput, and cost of wide area network links 1113*a*, 1113*b*, 1113*c*, and/or other factors that can contribute to the cost, speed, fault-tolerance, resiliency, efficiency and/or other design criteria of the moderation system architecture.

Example Methods of Operation

Figure 12:
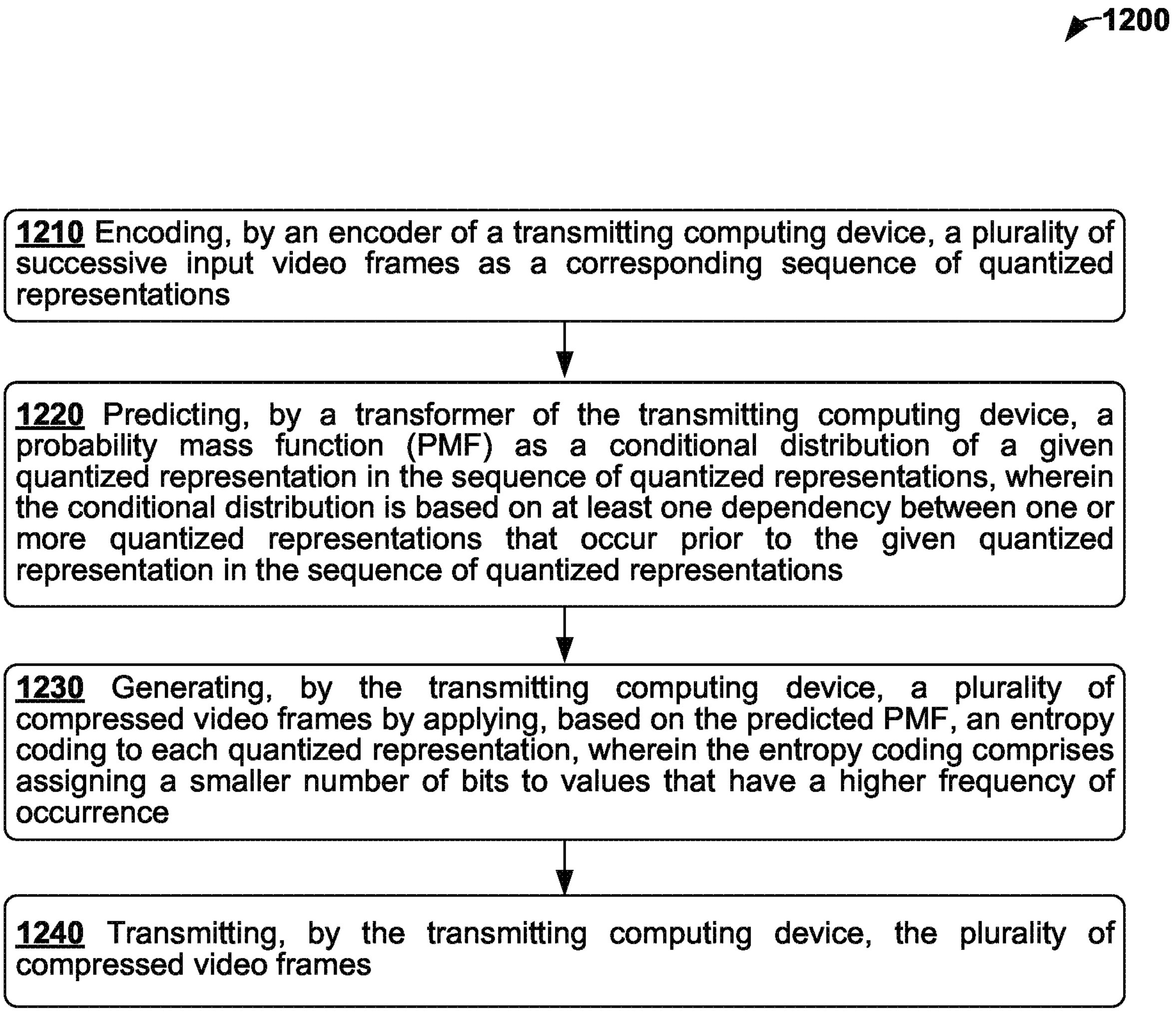
FIG. 12 is a flowchart of a method, in accordance with example embodiments.

FIG. 12 is a flowchart of a method 1200, in accordance with example embodiments. Method 1200 can be executed by a computing device, such as computing device 1000.

At block 1210, the method involves encoding, by an encoder of a transmitting computing device, a plurality of successive input video frames as a corresponding sequence of quantized representations.

At block 1220, the method involves predicting, by a transformer of the transmitting computing device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations.

At block 1230, the method involves generating, by the transmitting computing device, a plurality of compressed video frames by applying, based on the predicted PMF, an entropy coding to each quantized representation, wherein the entropy coding comprises assigning a smaller number of bits to values that have a higher frequency of occurrence.

At block 1240, the method involves transmitting, by the transmitting computing device, the plurality of compressed video frames.

Some embodiments involve receiving, by a receiving computing device, the plurality of compressed video frames. Such embodiments also involve generating, by a decoder of the receiving computing device and based on the probability mass function, a plurality of decompressed video frames.

In some embodiments, an average number of bits may correspond to a cross-entropy of the conditional distribution with respect to the predicted PMF.

In some embodiments, the predicting of the PMF involves maintaining a coding efficiency of the entropy coding by adjusting the cross-entropy.

In some embodiments, the encoder may perform a spatial downscaling and increase a channel dimension.

In some embodiments, the encoder may be a convolutional neural network (CNN) based image encoder.

In some embodiments, the decoder may be a convolutional neural network (CNN) based image decoder.

In some embodiments, the encoding of each frame involves a quantization of the quantized representation to an integer grid.

Some embodiments involve applying neural image compression to train one or more of the encoder or the decoder to be respective lossy transforms, wherein a target distortion variable is based on a range of each quantized representation.

In some embodiments, the training of the one or more of the encoder or the decoder may be based on a rate-distortion trade-off loss.

In some embodiments, the at least one dependency may be a temporal dependency.

Some embodiments involve splitting the given quantized representation spatially into non-overlapping blocks of size N×N. The one or more quantized representations that occur prior to the given quantized representation may be configured to be overlapping blocks of size M×M, with M>N. Each block may be spatially flattened to generate one or more tokens for the transformer. The predicting of the PMF may be based on a spatial context and a temporal context derived from the overlapping blocks.

In some embodiments, the predicting of the PMF by the transformer involves extracting, by a first transformer, separately from each of the overlapping blocks, temporal information corresponding to the one or more quantized representations that occur prior to the given quantized representation. Such embodiments also involve mixing, by a second transformer, the extracted temporal information.

In some embodiments, the transmitting computing device may include a camera. Such embodiments involve capturing the plurality of input video frames using the camera. Such embodiments also involve receiving, by the encoder, the plurality of input video frames from the camera.

In some embodiments, the receiving computing device may include a video player. Such embodiments involve outputting the plurality of decompressed video frames by the video player.

Some embodiments involve obtaining a trained version of the encoder and the transformer at the transmitting computing device. The encoding may be performed by the trained version of the encoder. The predicting may be performed by the trained version of the transformer.

Some embodiments involve obtaining a trained version of the decoder at the receiving computing device. The generating of the plurality of decompressed video frames may be performed by the trained version of the decoder.

In some embodiments, the encoder may be trained at the transmitting computing device.

In some embodiments, the decoder may be trained at a receiving computing device.

Some embodiments involve storing the plurality of compressed video frames at the transmitting computing device.

Some embodiments involve storing the plurality of decompressed video frames at the receiving computing device.

In some embodiments, the transmitting computing device may be the same as the receiving computing device.

In some embodiments, each frame of the plurality of input video frames may be independently encoded.

In some embodiments, one or more of the transmitting computing device or the receiving computing device may be a mobile phone.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method, comprising:

encoding, by an encoder of a transmitting computing device, a plurality of successive input video frames as a corresponding sequence of quantized representations;

predicting, by a transformer of the transmitting computing device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations;

generating, by the transmitting computing device, a plurality of compressed video frames by applying, based on the predicted PMF, an entropy coding to each quantized representation, wherein the entropy coding comprises assigning a smaller number of bits to values that have a higher frequency of occurrence; and transmitting, by the transmitting computing device, the plurality of compressed video frames.

2. The computer-implemented method of claim 1, further comprising:

receiving, by a receiving computing device, the plurality of compressed video frames; and generating, by a decoder of the receiving computing device and based on the predicted PMF, a plurality of decompressed video frames.

3. The computer-implemented method of claim 1, wherein an average number of bits corresponds to a cross-entropy of the conditional distribution with respect to the predicted PMF.

4. The computer-implemented method of claim 3, wherein the predicting of the PMF further comprises: maintaining a coding efficiency of the entropy coding by adjusting the cross-entropy.

5. The computer-implemented method of claim 1, wherein the encoder performs a spatial downscaling and increases a channel dimension.

6. The computer-implemented method of claim 1, wherein the encoder is a convolutional neural network (CNN) based image encoder.

7. The computer-implemented method of claim 1, wherein the encoding of each frame further comprises a quantization of the quantized representation to an integer grid.

8. The computer-implemented method of claim 1, further comprising:

applying neural image compression to train one or more of the encoder or the decoder to be respective lossy transforms, wherein a target distortion variable is based on a range of each quantized representation.

9. The computer-implemented method of claim 8, wherein the training of the one or more of the encoder or the decoder is based on a rate-distortion trade-off loss.

10. The computer-implemented method of claim 1, wherein the at least one dependency is a temporal dependency.

11. The computer-implemented method of claim 1, further comprising:

splitting the given quantized representation spatially into non-overlapping blocks of size N×N, and wherein the one or more quantized representations that occur prior to the given quantized representation are configured to be overlapping blocks of size M×M, with M>N, wherein each block is spatially flattened to generate one or more tokens for the transformer, and wherein the predicting of the PMF is based on a spatial context and a temporal context derived from the overlapping blocks.

12. The computer-implemented method of claim 11, wherein the predicting of the PMF by the transformer comprises:

extracting, by a first transformer, separately from each of the overlapping blocks, temporal information corresponding to the one or more quantized representations that occur prior to the given quantized representation; and mixing, by a second transformer, the extracted temporal information.

13. The computer-implemented method of claim 1, wherein the transmitting computing device comprises a camera, and the method further comprising:

capturing the plurality of input video frames using the camera; and receiving, by the encoder, the plurality of input video frames from the camera.

14. The computer-implemented method of claim 2, wherein the transmitting computing device is the same as the receiving computing device.

15. A computing device, comprising:

one or more processors; and data storage, wherein the data storage has stored thereon computer-executable instructions that, when executed by the one or more processors, cause the computing device to carry out functions comprising:

encoding, by an encoder of a transmitting computing device, a plurality of successive input video frames as a corresponding sequence of quantized representations;

predicting, by a transformer of the transmitting computing device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations;

generating, by the transmitting computing device, a plurality of compressed video frames by applying, based on the predicted PMF, an entropy coding to each quantized representation, wherein the entropy coding comprises assigning a smaller number of bits to values that have a higher frequency of occurrence; and transmitting, by the transmitting computing device, the plurality of compressed video frames.

16. A decoding device, comprising:

one or more processors; and data storage, wherein the data storage has stored thereon computer-executable instructions that, when executed by the one or more processors, cause the decoding device to carry out functions comprising:

receiving, by a decoder of the decoding device, a plurality of compressed video frames as a corresponding sequence of quantized representations;

predicting, by a transformer of the decoding device, a probability mass function (PMF) as a conditional distribution of a given quantized representation in the sequence of quantized representations, wherein the conditional distribution is based on at least one dependency between one or more quantized representations that occur prior to the given quantized representation in the sequence of quantized representations;

generating, by the decoding device, a plurality of decompressed video frames by applying, based on the predicted PMF, an entropy decoding to each quantized representation, wherein the entropy decoding comprises reversing an entropy encoding, and the entropy encoding having assigned a smaller number of bits to values with a higher frequency of occurrence; and providing, by the decoding device, the plurality of decompressed video frames.

17. The decoding device of claim 16, wherein an average number of bits corresponds to a cross-entropy of the conditional distribution with respect to the predicted PMF.

18. The decoding device of claim 16, the functions for the predicting of the PMF further comprising: maintaining a decoding efficiency of the entropy decoding by adjusting the cross-entropy.

19. The decoding device of claim 16, wherein the decoder is a convolutional neural network (CNN) based image decoder.

20. The decoding device of claim 16, the functions further comprising:

applying neural image decompression to train the decoder to be a lossy transform, wherein a target distortion variable is based on a range of each quantized representation.

21. The decoding device of claim 20, wherein the training of the decoder is based on a rate-distortion trade-off loss.

22. The decoding device of claim 17, wherein the at least one dependency is a temporal dependency.

* * * * *